(12) United States Patent
Kawabe et al.

(10) Patent No.: US 11,036,123 B2
(45) Date of Patent: Jun. 15, 2021

(54) VIDEO PRESENTATION DEVICE, METHOD THEREOF, AND RECORDING MEDIUM

(71) Applicant: NIPPON TELEGRAPH AND TELEPHONE CORPORATION, Chiyoda-ku (JP)

(72) Inventors: Takahiro Kawabe, Atsugi (JP); Shinya Nishida, Atsugi (JP); Kazushi Maruya, Atsugi (JP); Masataka Sawayama, Atsugi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/739,414

(22) Filed: Jan. 10, 2020

(65) Prior Publication Data

US 2020/0150521 A1   May 14, 2020

Related U.S. Application Data

(62) Division of application No. 15/306,011, filed as application No. PCT/JP2015/062093 on Apr. 21, 2015, now Pat. No. 10,571,794.

(30) Foreign Application Priority Data

Apr. 22, 2014   (JP) .................................. 2014-088389
Nov. 13, 2014   (JP) .................................. 2014-230720

(51) Int. Cl.
*G09G 5/00*      (2006.01)
*G03B 25/00*     (2006.01)
*G03B 21/32*     (2006.01)

(52) U.S. Cl.
CPC .............. *G03B 25/00* (2013.01); *G03B 21/32* (2013.01); *G09G 5/00* (2013.01); *G09G 2340/10* (2013.01)

(58) Field of Classification Search
CPC ........................................................ G09G 5/00
(Continued)

(56) References Cited

U.S. PATENT DOCUMENTS

| 4,530,009 A | 7/1985 | Mizokawa |
| 6,567,564 B1 * | 5/2003 | van der Wal ............. G06T 1/20 375/E7.093 |

(Continued)

FOREIGN PATENT DOCUMENTS

| CN | 1645468 A | 7/2005 |
| CN | 1770204 A | 5/2006 |

(Continued)

OTHER PUBLICATIONS

Ramesh Raskar, et al., "Cartoon Dioramas in Motion", Mitsubishi Electric Research Laboratories, International Symposium on Non-Photorealistic Animation and Rendering (NPAR), Total 8 Pages, (2002).

(Continued)

*Primary Examiner* — David T Welch
(74) *Attorney, Agent, or Firm* — Oblon, McClelland, Maier & Neustadt, L.L.P.

(57) ABSTRACT

A video is superimposed on an object in order that the object will be perceived as if the object were given a motion. This video is a video including a luminance motion component corresponding to a motion given to the object.

5 Claims, 19 Drawing Sheets

START

SUPERPOSE AND DISPLAY VIDEO, IN WHICH PICTURE IMAGES INCLUDING LOW SPATIAL FREQUENCY COMPONENTS IN DISTORTION DISTRIBUTION ARE TEMPORALLY SWITCHED, ON STATIC OBJECT SO THAT EDGE INCLUDED IN VIDEO IS OVERLAPPED WITH OUTLINE OF OBJECT OR EDGE INCLUDED IN OBJECT — S11a

END

(58) Field of Classification Search
USPC .......................................................... 345/473
See application file for complete search history.

(56) References Cited

U.S. PATENT DOCUMENTS

| | | | |
|---|---|---|---|
| 2003/0043152 A1 | 3/2003 | Raskar | |
| 2003/0063361 A1 | 4/2003 | Ohnishi | |
| 2006/0269097 A1* | 11/2006 | Mihcak | H04N 21/2347 382/100 |
| 2008/0123985 A1 | 5/2008 | Fujibayashi | |
| 2012/0288004 A1* | 11/2012 | Sato | H04N 19/52 375/240.16 |
| 2014/0247890 A1* | 9/2014 | Yamaguchi | H04N 19/172 375/240.29 |
| 2014/0307978 A1 | 10/2014 | Balestrieri | |
| 2014/0327680 A1 | 11/2014 | Hoppe | |
| 2014/0327738 A1 | 11/2014 | Jacobs | |
| 2016/0095513 A1 | 4/2016 | Shapiro | |
| 2016/0328827 A1* | 11/2016 | Ilic | H04N 5/2624 |

FOREIGN PATENT DOCUMENTS

| | | |
|---|---|---|
| EP | 0 052 996 A1 | 6/1982 |
| JP | 7-93558 A | 4/1995 |
| JP | 2003-99799 A | 4/2003 |
| JP | 2004-88728 A | 3/2004 |
| JP | 2004-173320 A | 6/2004 |
| JP | 2005-204923 A | 8/2005 |
| JP | 2010-187723 | 9/2010 |
| JP | 2011-22762 A | 2/2011 |
| JP | 2011-85686 A | 4/2011 |
| WO | WO 2015/163317 A1 | 10/2015 |

OTHER PUBLICATIONS

William T. Freeman, et al., "Motion Without Movement", Computer Graphics, vol. 25, No. 4, pp. 27-30, (Jul. 1991).
Takahiro Kawabe, et al., "Seeing transparent liquids from dynamic image distortion", Journal of Vision, vol. 13, No. 9, p. 208, (2013).
Andrew B. Watson, et al., "Model of human visual-motion sensing", Journal of the Optical Society of America, vol. 2, No. 2, pp. 322-342, (Feb. 1985).
V. S. Ramachandran, "Interaction between colour and motion in human vision", Nature, vol. 328, No. 6131, pp. 645-647, (Aug. 13, 1987).
Stuart Anstis, "Kinetic Edges Become Displaced, Segregated, and Invisible", Neural Mechanisms of Visual Perception, Proceedings of the Second Retina Research Foundation Conference, Texas, pp. 247-260, (1989).
V. S. Ramachandran, et al., "Does colour provide an input to human motion perception?", Nature, vol. 275, pp. 55-56, (Sep. 7, 1978).
D. H. Kelly, "Motion and vision. II. Stabilized spatio-temporal threshold surface", Journal of the Optical Society of America, vol. 69, No. 10, pp. 1340-1349, (Oct. 1979).
Allan Pantle, et al., "Contrast Response of Human Visual Mechanisms Sensitive to Orientation and Direction of Motion", Vision Research, vol. 9, pp. 397-406, (1969).
Takahiro Kawabe, et al., "A light projection method to perceptually deform two-dimensional static objects by motion information", Annual Conference of the Institute of Image Information and Television Engineers, Total 2 Pages, (2014), (with English Abstract).
International Search Report dated Jul. 28, 2015 in PCT/JP2015/062093 filed Apr. 21, 2015.
Extended European Search Report dated Nov. 10, 2017 in Patent Application No. 15783584.4.
Office Action dated Dec. 19, 2017 in Japanese Patent Application No. 2016-514945 (w/English language translation), 16 pages.
Office Action dated Aug. 31, 2018 in European Patent Application No. 15 783 584.4.
Office Action dated Dec. 4, 2018 in Japanese Application No. 2018-022975 (w/English translation).
Office Action dated Mar. 13, 2019 in European Application No. 15783584.4.
Extended European Search Report dated Mar. 17, 2020 in corresponding European Patent Application No. 19188084.8, 15 pages.

* cited by examiner

VIDEO PRESENTATION DEVICE, METHOD THEREOF, AND RECORDING MEDIUM

CROSS-REFERENCE TO RELATED APPLICATIONS

This application is a division of and claims the benefit of priority under 35 U.S.C. § 120 from U.S. application Ser. No. 15/306,011 filed Oct. 21, 2016, the entire contents of which are incorporated herein by reference. U.S. application Ser. No. 15/306,011 is a National Stage of PCT/JP15/062093 filed Apr. 21, 2015, which claims the benefit for priority under 35 U.S.C. § 119 from Japanese Application No. 2014-088389 filed Apr. 22, 2014 and Japanese Application No. 2014-230720 filed Nov. 13, 2014.

TECHNICAL FIELD

The present invention relates to a technique for providing visual illusion.

BACKGROUND ART

Non-patent Literature 1 discloses a technique in which a three-dimensional shape of an object (single achromatic color) is measured with a camera and a video representing a motion is projected in conformity with the three-dimensional shape of the object so as to give an effect of an illusory motion to the object. In Non-patent Literature 1, the effect of a motion is given to an object such that a flat single-achromatic plane and a single-achromatic automobile model which is placed on the plane are set as an object which serves as a canvas and a color scheme which is obtained by simulating colors and reflection properties of a body of an automobile, roads around the automobile, conditions of daylight in a space in which the automobile travels, and the like is projected as a video onto the object so as to provide an illusion as if the automobile model which is the object travels roads.

PRIOR ART LITERATURE

Non-Patent Literature

Non-patent Literature 1: Raskar, R.; Ziegler, R.; Willwacher, T., "Cartoon Dioramas in Motion", International Symposium on Non-Photorealistic Animation and Rendering (NPAR), June 2002.

SUMMARY OF THE INVENTION

Problems to be Solved by the Invention

In Non-patent Literature 1, the object is assumed merely as a canvas and the effect of a motion is provided to the object without using a pattern of the object. An object of the present invention is to allow an object to be perceived as if the object were given a motion, by using a pattern of the object.

Means to Solve the Problems

In order that an object will be perceived as if the object were given a motion, a video is superimposed on the object. This video includes a luminance motion component corresponding to the motion given to the object.

Effects of the Invention

Accordingly, the object can be perceived as if the object were given a motion by using a pattern of the object.

DETAILED DESCRIPTION OF THE EMBODIMENTS

Figure 1:
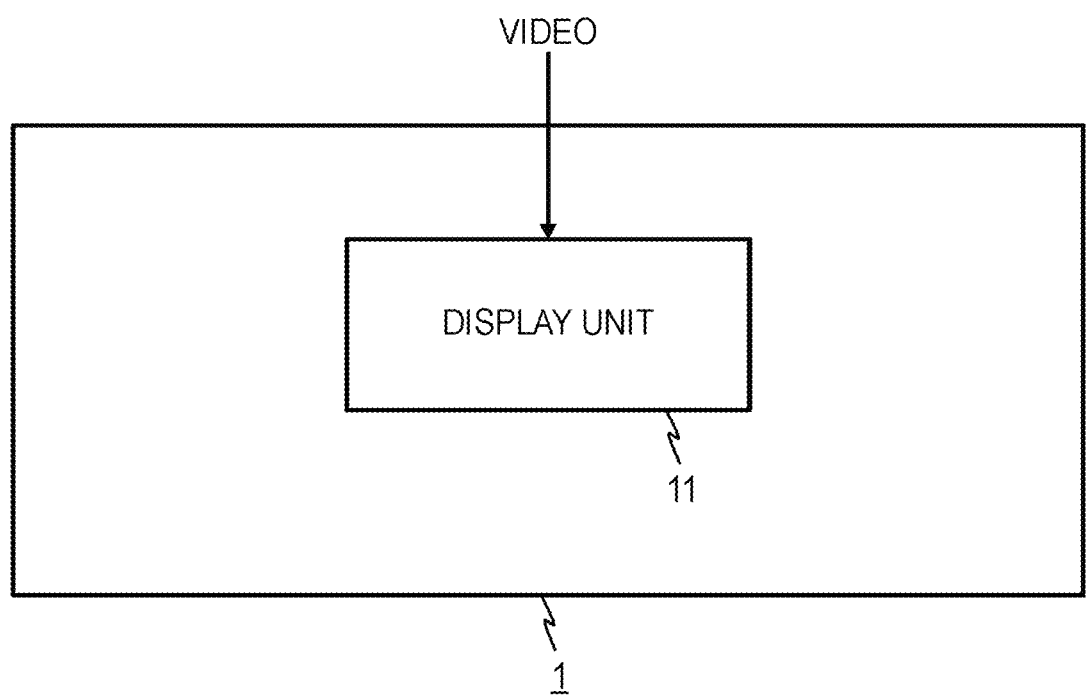
FIG. 1 is a block diagram illustrating the configuration of a video display device according to a first embodiment.

Embodiments of the present invention will be described. In the embodiments described below, an appearance of a pattern is deformed illusorily while using the pattern of an object unlike the previous techniques. In each of the embodiments, an object is not merely assumed as a canvas, but a pattern of the object is actively used to create an illusion of a motion. Accordingly, the object is not set to be single-achromatic but preferably set to be chromatic or in the grayscale. In each of the embodiments, three-dimensionality of an object does not have to be considered unlike the related art. For example, an appearance of a picture image obtained by photographing a static object can also be deformed illusorily. In the related art, aspects in transfer and deformation of an object have been focused. However, both of a pattern of an object and image information of a video which is superimposed and displayed on the object are used to provide the object with textures and impressions which do not originally exist on the object (an impression of liquid or facial expressions) in each of the embodiments. Thus, the embodiments are different from the previous techniques on this point. Further, different from the technique for merely deforming a taken picture image on a screen, texture impression change of an object can be provided to viewers by superposition of a video. Accordingly, perceptual experiences different from those of the related art can be provided to viewers. Each of the embodiments will be described in detail below. Here, constituent elements having the same functions will be given the same reference numerals and duplicated description will be omitted.

First Embodiment

Figure 2:
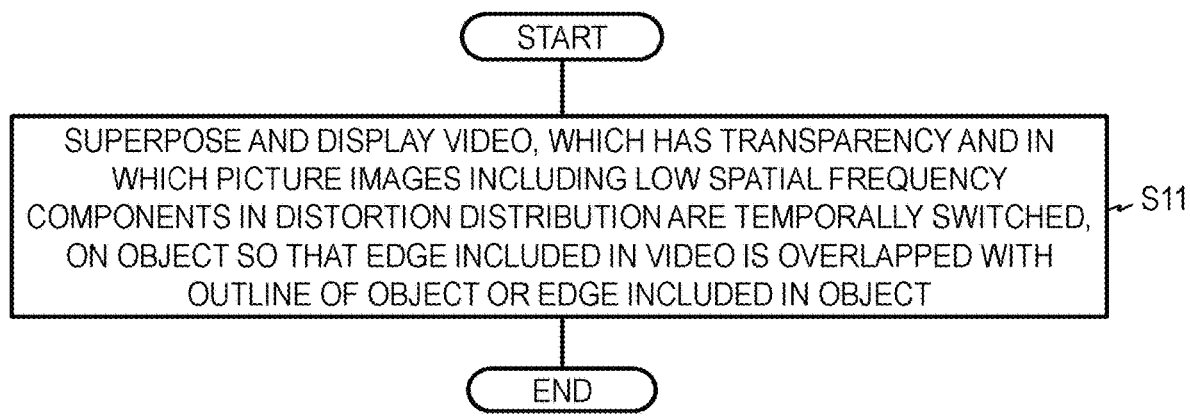
FIG. 2 is a flowchart illustrating an operation of the video display device according to the first embodiment.

A video display device, according to a first embodiment, which is a basic configuration example of the present invention is described below with reference to FIGS. 1 and 2. FIG. 1 is a block diagram illustrating the configuration of a video display device 1 according to the present embodiment. FIG. 2 is a flowchart illustrating an operation of the video display device 1 according to the present embodiment. As illustrated in FIG. 1, the video display device 1 includes a display unit 11. The display unit 11 superimposes and displays a video having transparency on an object. Here, the "object" may be a thing having a three-dimensional shape (a vase, a ball, or a model, for example) or a predetermined plane (a paper, a board, a wall, or a screen, for example). In the case where the object is a plane, a pattern is preferably included in the plane. Possible examples of the pattern included in the plane include a photograph and a picture image printed on a paper and a photograph and a picture image projected onto a predetermined plane. In the case where a screen such as a display is set as the object, possible examples of the pattern include a picture image displayed on the screen such as a display.

Examples of the method for "superposing and displaying" a video having transparency on an object include a method for projecting a video onto the object by a projector or the like as a typical method. In this case, the video projected by a projector or the like naturally has transparency. Further, a transparent liquid crystal screen may be placed in front of an object and a video having transparency may be distributed on the liquid crystal screen so as to "superimpose and display" a video having transparency on the object when viewed from a viewer opposed to the object with the liquid crystal screen interposed, for example. Here, the "video" represents a video in which picture images, which have distortion distribution including low spatial frequency components, are temporally switched, for example. In the present embodiment, it is assumed that a video is prepared in advance and is input from the outside of the video display device 1. The display unit 11 displays a video so that an edge included in the video is overlapped with an outline of the object or on an edge included in the object. For example, in the case where the object is a vase, the display unit 11 displays a video so that an edge included in the video is overlapped with an outline of the vase which is the object or an edge included in the vase such as a pattern drawn on the vase. For example, in the case where the object is a plane and a picture image is projected as a pattern on the plane, the display unit 11 displays a video so that an edge included in the video is overlapped with an edge included in the object such as a pattern of the picture image projected on the object.

Thus, the display unit 11 superimposes and displays a video, which has transparency and in which picture images having distortion distribution including low spatial frequency components are temporally switched, on the object so that an edge included in the video is overlapped with an outline of the object or an edge included in the object (S11).

Example of First Embodiment

Figure 3:
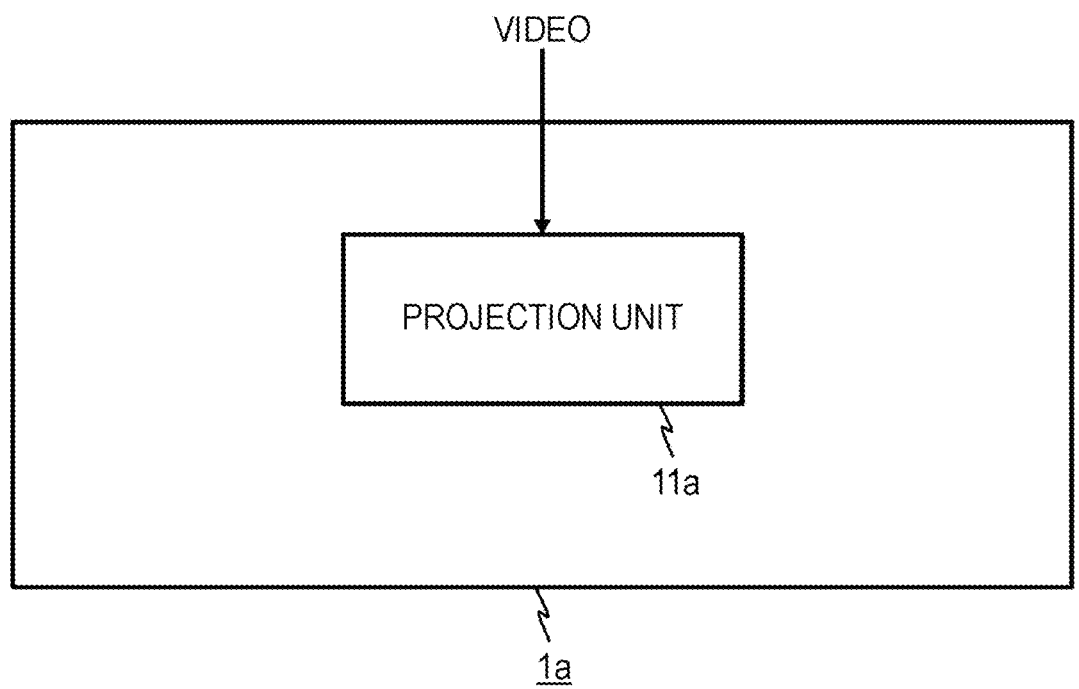
FIG. 3 is a block diagram illustrating the configuration of a video projection device according to an example of the first embodiment.
Figure 4:
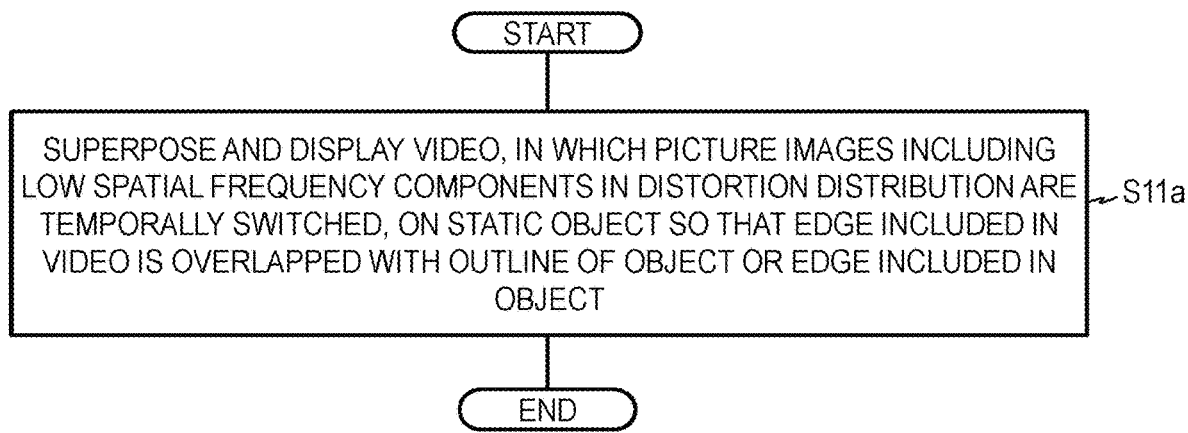
FIG. 4 is a flowchart illustrating an operation of the video projection device according to the example of the first embodiment.
Figure 5:
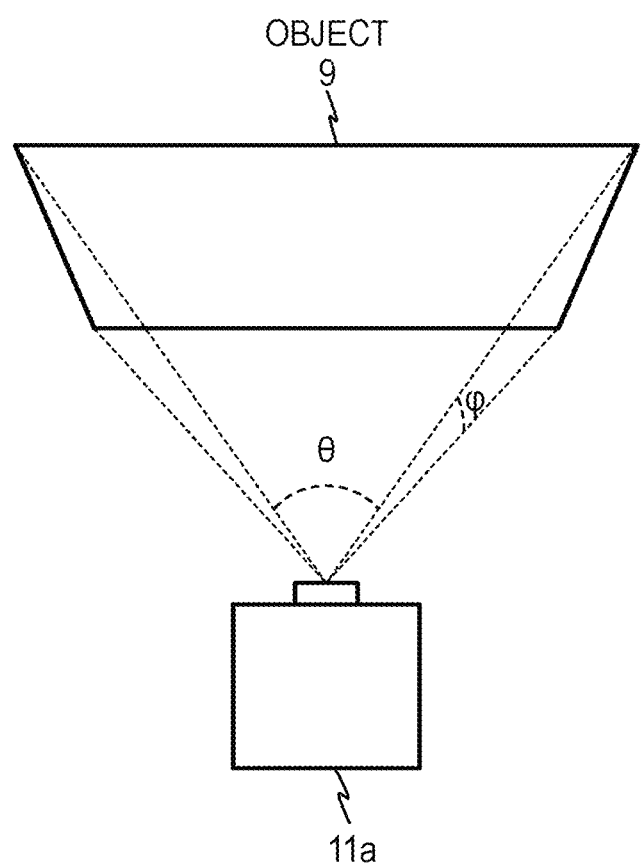
FIG. 5 is a diagram for explaining a relationship between a projection image angle and an object in the case where a projection unit of the video projection device according to the example of the first embodiment is realized by a projector.

A video projection device 1a which is an example of the first embodiment will be described below with reference to FIGS. 3 and 4. FIG. 3 is a block diagram illustrating the configuration of the video projection device 1a which is the example of the present embodiment. FIG. 4 is a flowchart illustrating an operation of the video projection device 1a which is the example of the present embodiment. As illustrated in FIG. 3, the video projection device 1a is configured to include a projection unit 11a. In the present example, a static object will be discussed. In a similar manner to the above description, the projection unit 11a superimposes and projects a video, in which picture images having distortion distribution including low spatial frequency components are temporally switched, on the static object so that an edge included in the video is overlapped with an outline of the object or an edge included in the object (S11a). The projection unit 11a can be realized by a projector, for example. In the case where the projection unit 11a is a projector, for example, a viewing angle θ in the horizontal direction and a viewing angle di in the vertical direction, which are viewed from the center of a projection lens of the projector, of an object 9 are required to be accorded with viewing angles in the horizontal and vertical directions of the projected video as illustrated in FIG. 5.

Here, the projection unit 11a can be similarly adopted as an example of the display unit 11 also in second, third, and fourth embodiments, which will be described later, and each block diagram illustrating each corresponding device of the later-described embodiment illustrates that the projection unit 11a is included as the example of the display unit 11.

In the technique of Non-patent Literature 1, it is not easy to provide a special illusion showing as if a medium (for example, air, water, or water vapor) around an object wavered irregularly. Provision of an illusion as the above-described special illusion by applying the technique of Non-patent Literature 1 requires enormous calculation for simulating wavering of a medium, refraction of a ray of light, and the like. According to the video projection device 1a of the present embodiment, a special illusion can be given to an object with a small calculation amount. Further, according to the video projection device 1a of the present embodiment, an illusion can be given to an object having a planar shape, an object having a three-dimensional shape, a chromatic object, and an achromatic object having variations in contrast density as well.

Second Embodiment

Figure 6:
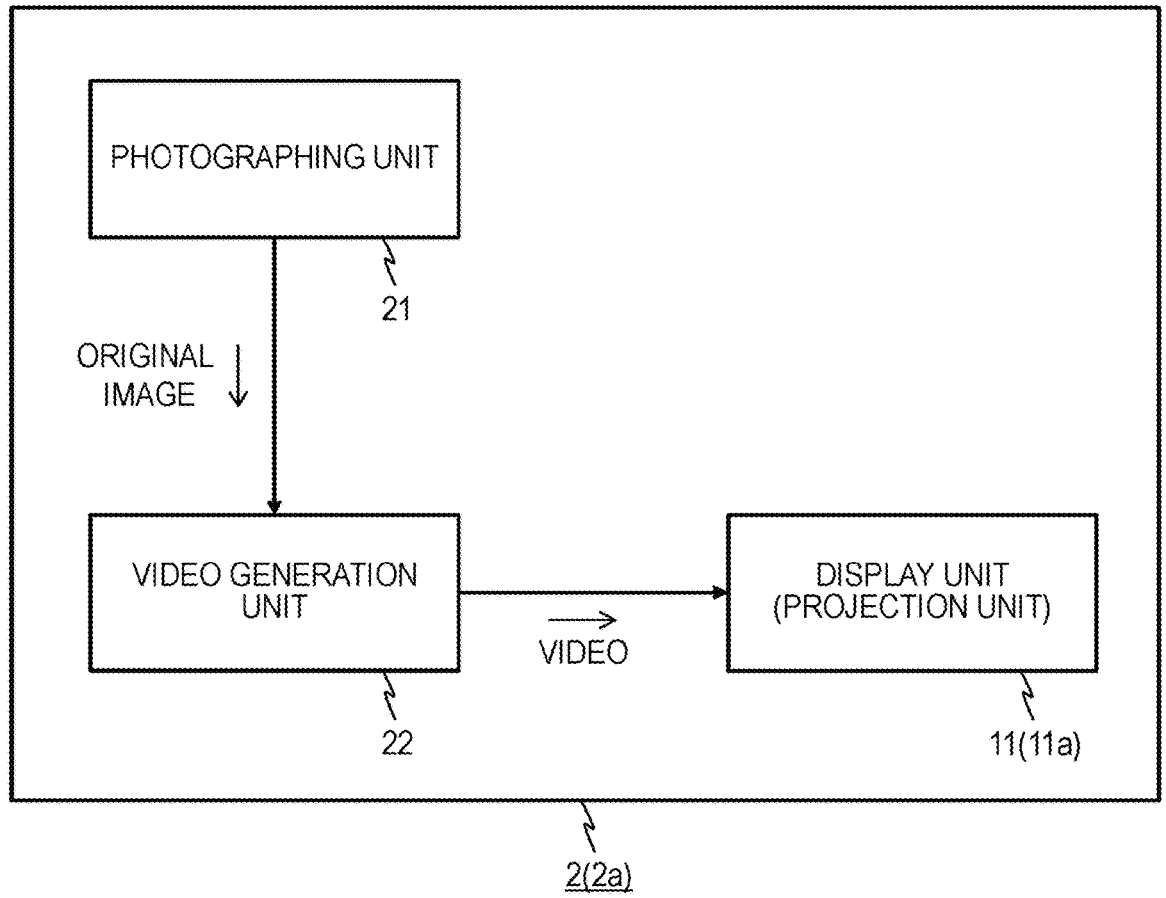
FIG. 6 is a block diagram illustrating the configuration of a video display device according to a second embodiment.
Figure 7:
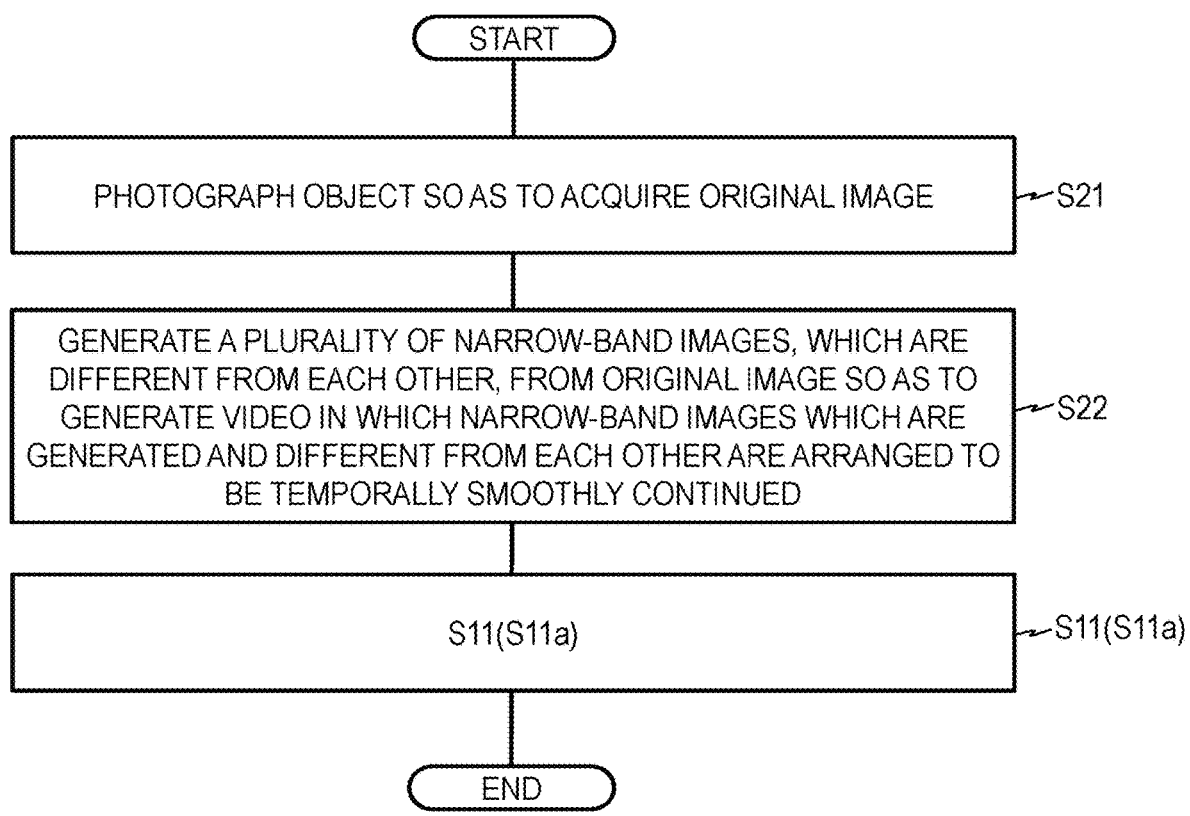
FIG. 7 is a flowchart illustrating an operation of the video display device according to the second embodiment.

A video display device 2, according to the second embodiment, including a video generation function therein will be described below with reference to FIGS. 6 and 7. FIG. 6 is a block diagram illustrating the configuration of the video display device 2 according to the present embodiment. FIG. 7 is a flowchart illustrating an operation of the video display device 2 according to the present embodiment. As illustrated in FIG. 6, the video display device 2 includes a display unit 11 which is same as that of the first embodiment, a photographing unit 21, and a video generation unit 22.

The photographing unit 21 photographs an object so as to acquire an original image (S21). The video generation unit 22 generates several narrow-band images, which are different from each other, from the original image so as to generate a video in which the narrow-band images which are generated and different from each other are arranged to be temporally smoothly continued (S22). The display unit 11 superimposes and displays the generated video on the object as is the case with the above description (S11).

The narrow-band image is a picture image which is obtained such that a spatial frequency band of the whole picture image is narrowed to be narrower than the spatial frequency band of the original image while maintaining information of an edge included in the original image, and further, the narrow-band image is a picture image having transparency.

As an implementation of the video generation unit 22, picture images may be convoluted by an orientation filter a phase of which is different from those of the picture images by 180 degrees and the convoluted picture images may be temporally smoothly continued so as to generate a video which provides a motional impression illusorily, as the description of Reference Literature 1, for example.

(Reference Literature 1: Freeman, W. T., Adelson, E. H., & Heeger, D. J. (1991). Proceedings of the 18th annual conference on computer graphics and interactive techniques, 27-30.)

Third Embodiment

Figure 8:
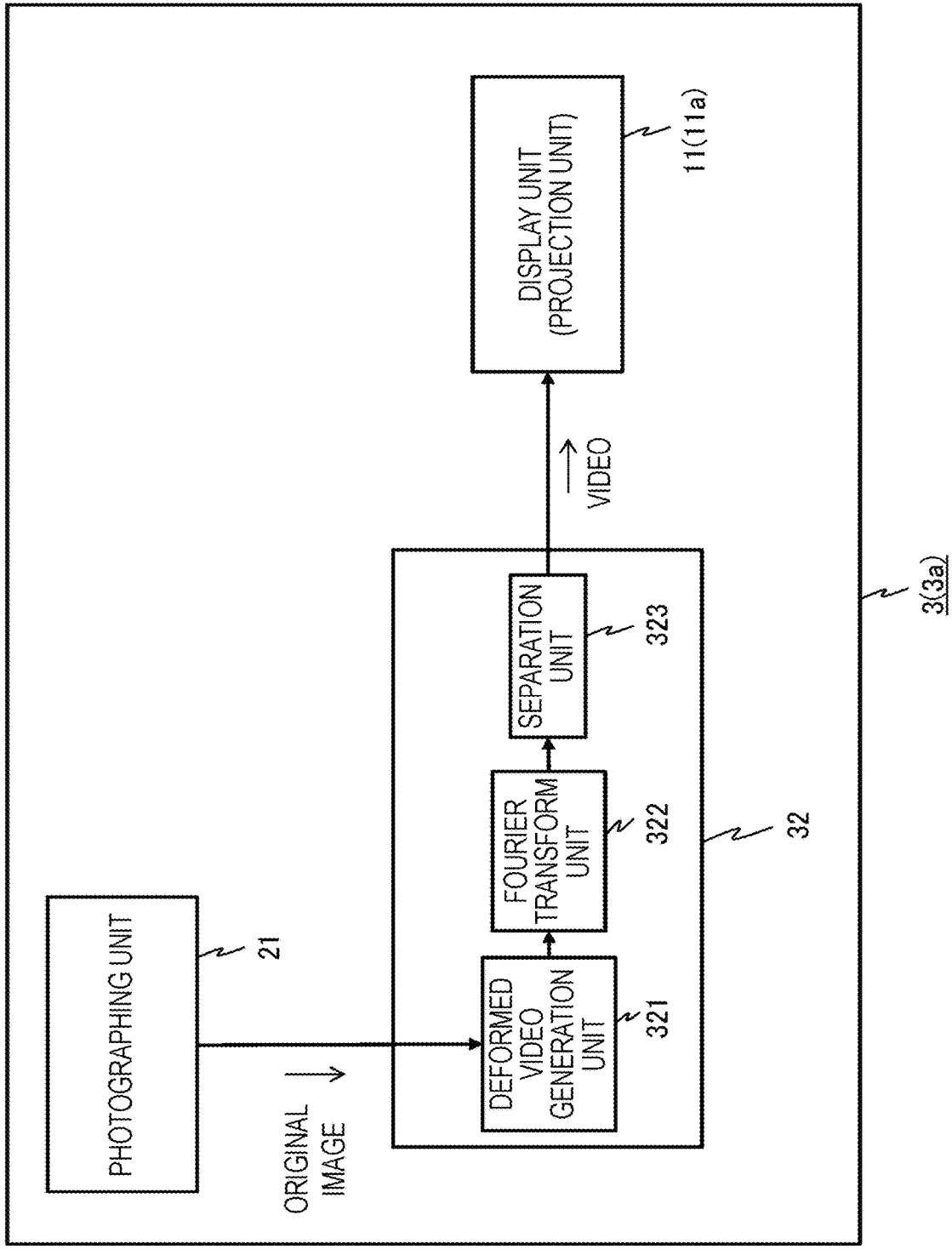
FIG. 8 is a block diagram illustrating the configuration of a video display device according to a third embodiment.
Figure 9:
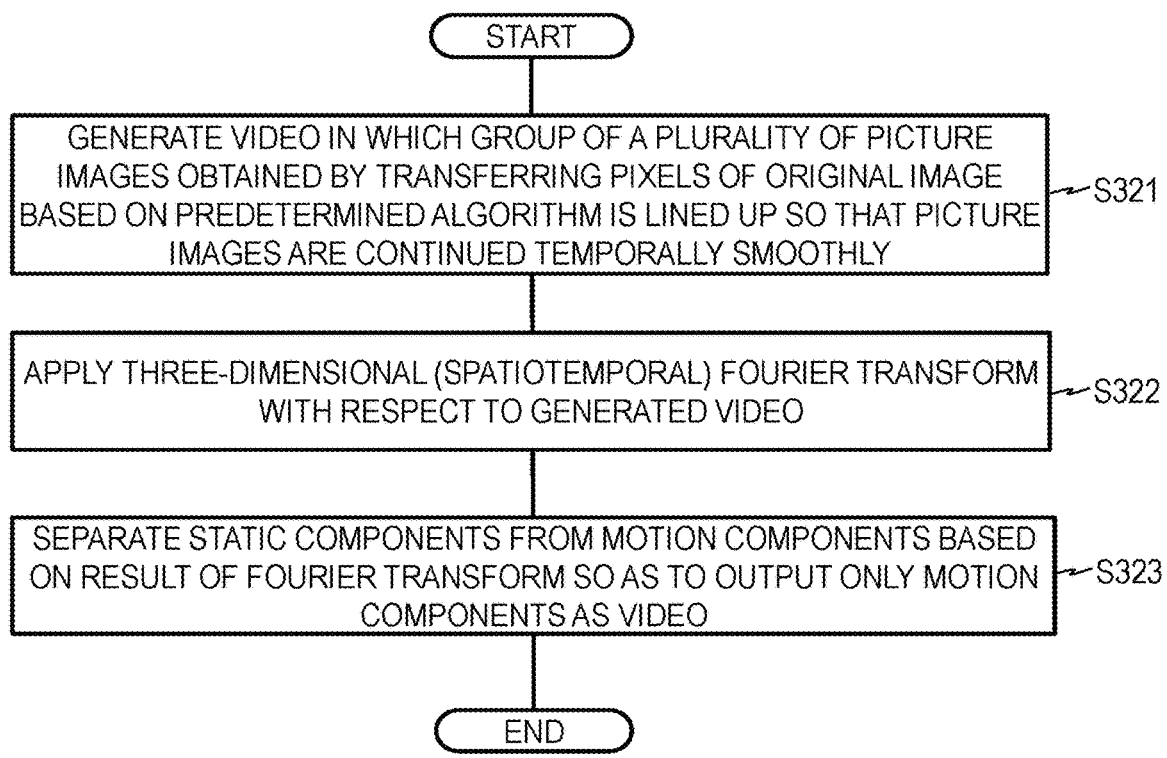
FIG. 9 is a flowchart illustrating an operation of a video generation unit of the video display device according to the third embodiment.

A video display device 3, according to the third embodiment, including a video generation function therein will be described below with reference to FIGS. 8 and 9. FIG. 8 is a block diagram illustrating the configuration of the video display device 3 according to the present embodiment. FIG. 9 is a flowchart illustrating an operation of a video generation unit 32 of the video display device 3 according to the present embodiment. As illustrated in FIG. 8, the video display device 3 includes a display unit 11 and a photographing unit 21 which are same as those of the second embodiment and the video generation unit 32 which is different from that of the second embodiment. The video generation unit 32 includes a deformed video generation unit 321, a Fourier transform unit 322, and a separation unit 323. The deformed video generation unit 321 applies dynamic deformation to an original image obtained by photographing an object so as to generate a video in which a static object image is deformed (S321). The deformation is expressed by pixel warp. This pixel warp is based on an algorithm which is preliminarily calculated. In the case where a liquid impression is desired to be given to an object, for example, algorithms of Reference Literature 2 and Japanese Patent Application No. 2013-132609 which is a patent application which had not been published at the time of filing of the concerned application are used as a reference.

(Reference Literature 2: Kawabe, T., Maruya, K., & Nishida, S. (2013). Seeing transparent liquids from dynamic image distortion. Journal of Vision, 13(9): 208.)

An implementation of the deformed video generation unit 321 based on the algorithm of Japanese Patent Application No. 2013-132609 is disclosed below. The deformed video generation unit 321 first generates several modulated images obtained by modulating an original image based on distortion distribution. At this time, in order to provide strong perception of an impression for flow of transparent liquid, it is preferable that the original image is modulated with distortion so that a spatial frequency of distortion distribution (distortion map) is equal to or smaller than 3 cpd (cycles per degree). In other words, when rough distortion, by which a gap of distortion amounts between adjacent pixels becomes smaller, is applied to the original image, an impression of transparent liquid can be further strongly perceived. Here, the original image may be modulated by using distortion distribution including identical low spatial frequency components (for example, 3 cpd or smaller) or by using distortion distribution including different low spatial frequency components (for example, 2 cpd or smaller for one and 3 cpd or smaller for the other). Further, two or more dimensional distortion directions are given to the modulated images. Any distortion may be employed as long as the distortion is two-dimensional geometric distortion such as rotation distortion, parallel movement distortion, and random distortion.

Then, the deformed video generation unit 321 generates a video based on several modulated images which are generated from the original image. The deformed video generation unit 321 may generate a modulated image sequence in which several modulated images generated from the original image are ordered so as to be temporally switched and presented as a video, for example. The modulated image sequence is a sequence in which presentation time (frame rate) of each picture image is set in the range that viewers can view the modulated image sequence not as a sequence of static images but as a moving image, that is, a "video which is structured by temporally lining up modulated images". Further, the deformed video generation unit 321 may perform control for switching and presenting each of several modulated images generated from the original image, for example. The presentation interval of each picture image may be controlled in the range that viewers can view the modulated images not as a sequence of static images but as a moving image (a video). The presentation time of each picture image may be set within 0.05 (sec) or the frame rate may be set to be 20 Hz or larger, for example.

Then, the Fourier transform unit 322 applies three-dimensional (spatiotemporal) Fourier transform with respect to the video which is generated by the deformed video generation unit 321 (S322). The separation unit 323 separates DC components (static components) from motion components by temporal filtering so as to output only the motion components as a video (S323).

In another expression, the deformed video generation unit 321 generates a video in which a group of several picture images obtained by warping pixels of the original image based on a predetermined algorithm is lined up so that the picture images are continued temporally smoothly (S321). The Fourier transform unit 322 applies three-dimensional (spatiotemporal) Fourier transform with respect to the generated video (S322). The separation unit 323 separates static components from motion components based on the result of the Fourier transform so as to output only the motion components as a video (S323).

Figure 10:
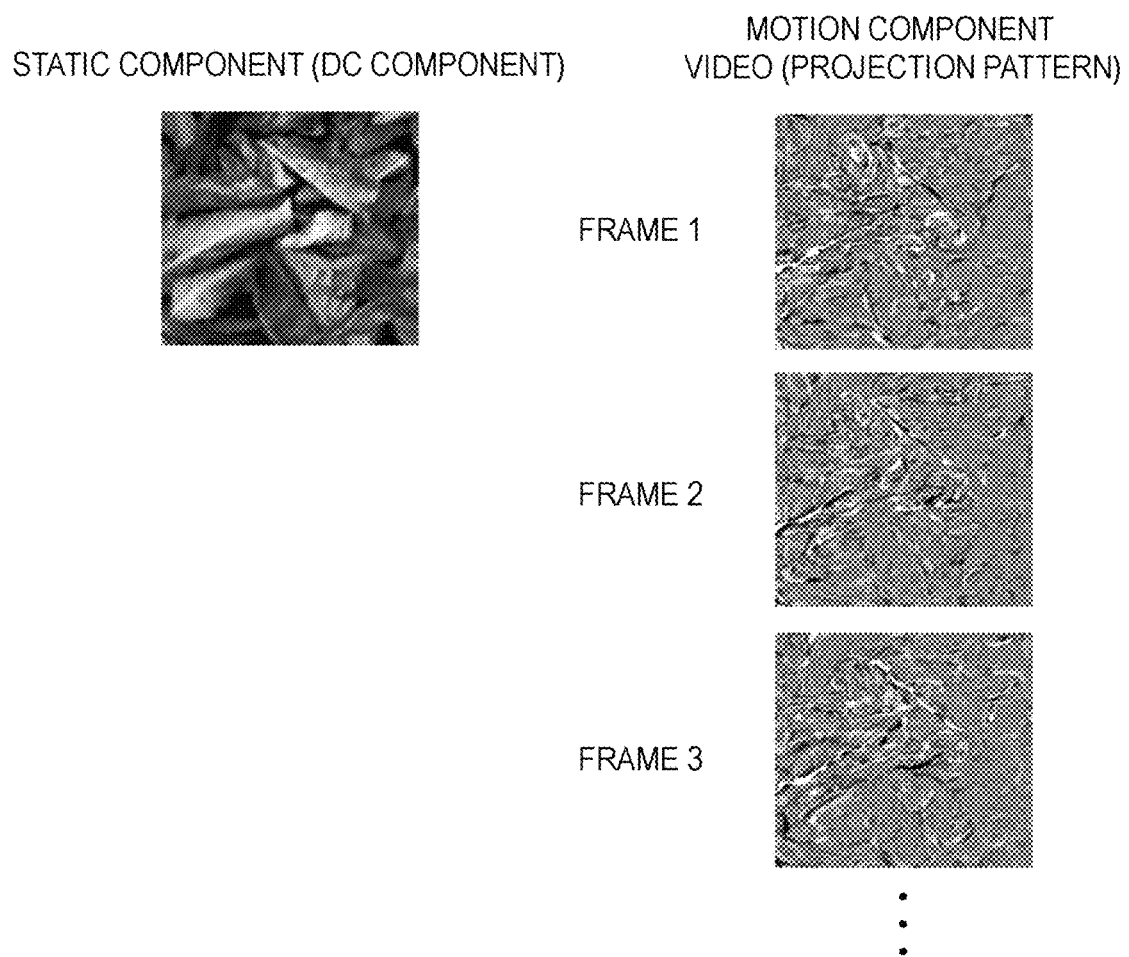
FIG. 10 is a diagram illustrating a static component and a motion component.

FIG. 10 illustrates examples of the static component (DC component) and the motion component which are extracted through the above-mentioned steps S321 to S323. The motion components are mainly constituted of a high spatial frequency component. As illustrated in FIG. 5, the motion components are superimposed and displayed, as a video, on an object in a viewing angle same as that of the object and thus, the phase relationship of the two is accorded with the original moving image. Under this condition, the spatial structure of the object is illusorily captured due to the motion components. As a result, the object looks moving.

Fourth Embodiment

Figure 11:
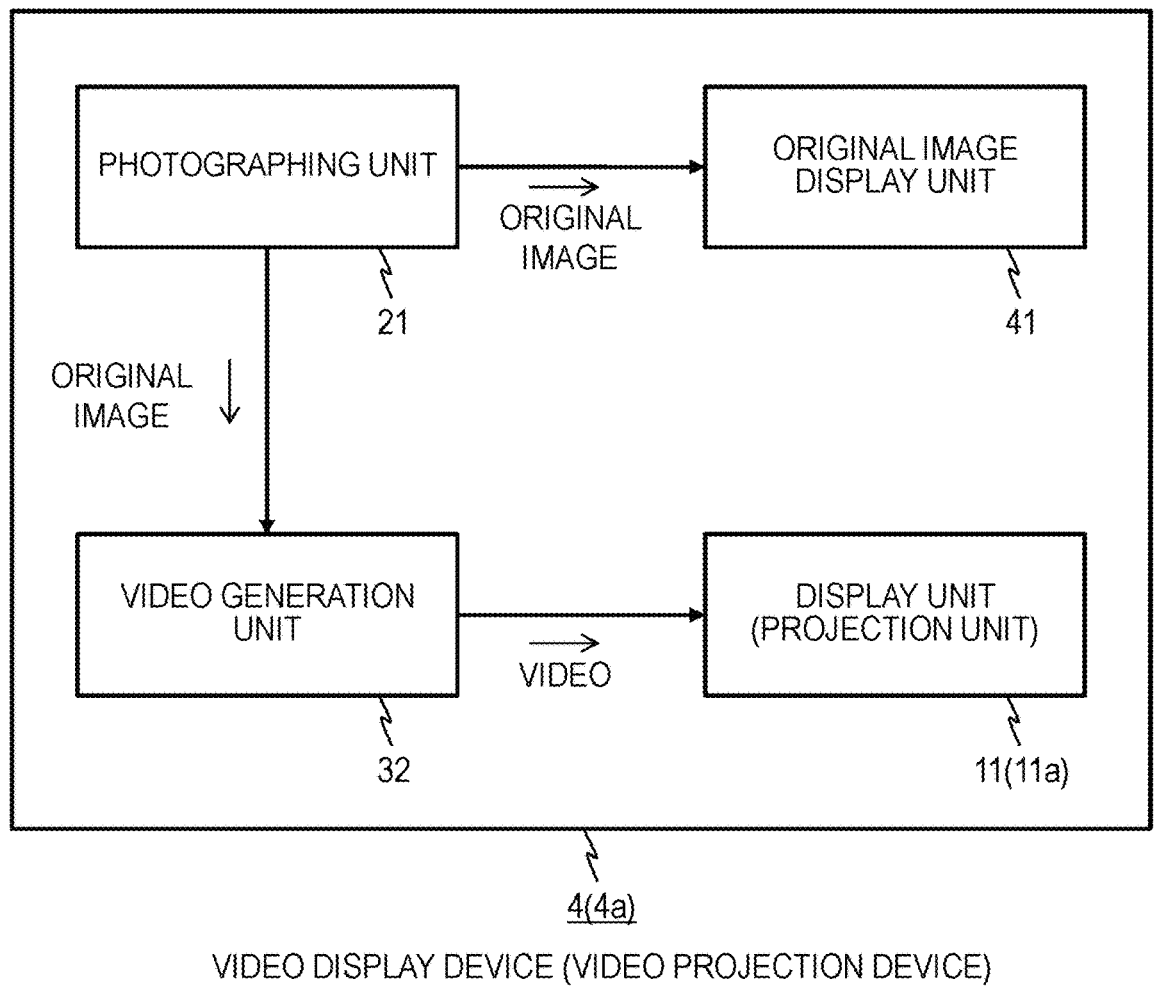
FIG. 11 is a block diagram illustrating the configuration of a video display device according to a fourth embodiment.
Figure 12:
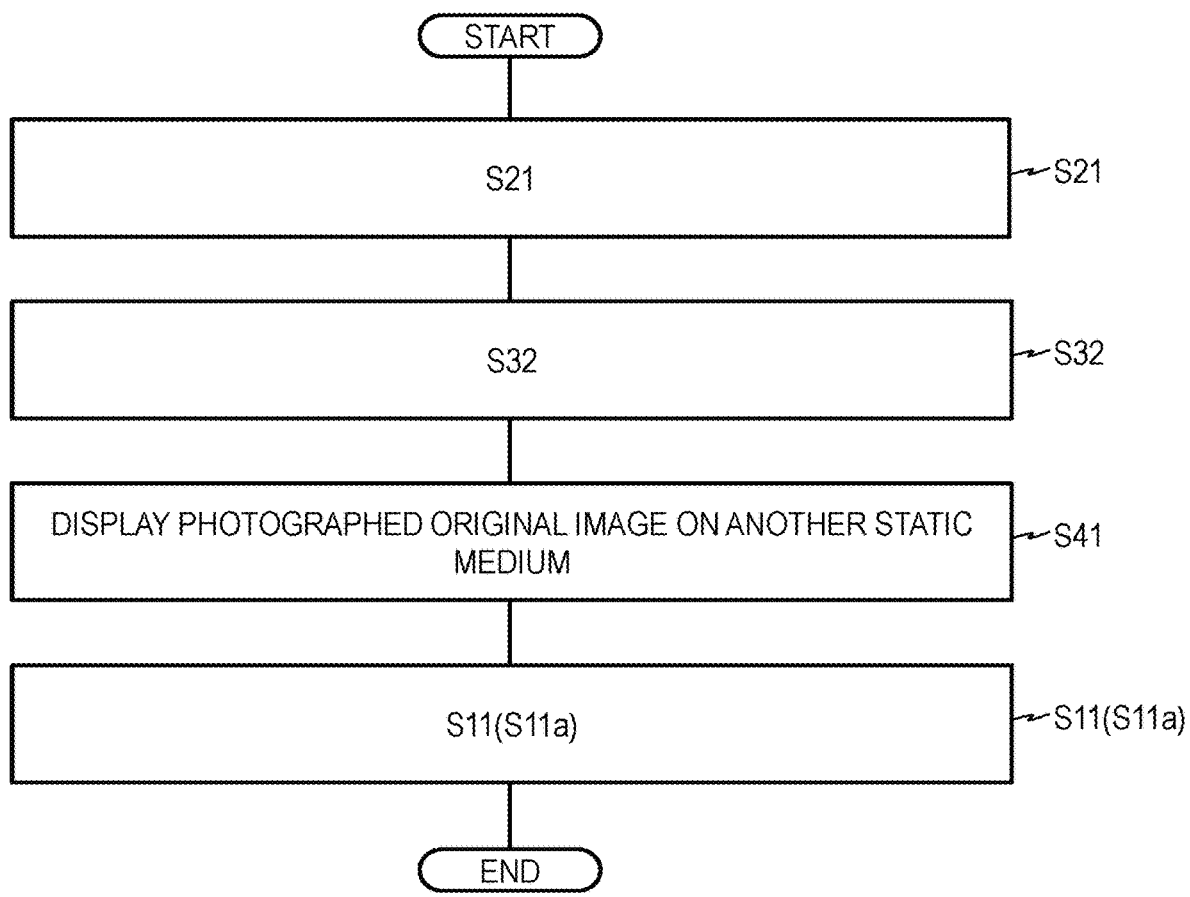
FIG. 12 is a flowchart illustrating an operation of the video display device according to the fourth embodiment.

A video display device 4, according to the fourth embodiment, including a function therein for generating an original image which is to be displayed on an object will be described below with reference to FIGS. 11 and 12. FIG. 11 is a block diagram illustrating the configuration of the video display device 4 according to the present embodiment. FIG. 12 is a flowchart illustrating an operation of the video display device 4 according to the present embodiment. As illustrated in FIG. 11, the video display device 4 of the present embodiment includes a display unit 11, a photographing unit 21, and a video generation unit 32 which are same as those of the third embodiment and an original image display unit 41 which is not included in the third embodiment. The photographing unit 21 and the video generation unit 32 respectively execute steps S21 and S32 as is the case with the third embodiment. The original image display unit 41 displays (projects) an original image which is acquired by photographing an object in step S21 on another static medium (for example, a display, a screen, or the like) (S41). The display unit 11 superimposes and displays (projects) a video with respect to the original image, which is thus displayed on the static medium. Accordingly, the effect same as that in the above description is obtained. At this time, the video may be generated by convoluting an orientation filter with respect to picture images as described in the second embodiment or may be generated by deforming picture images as described in the third embodiment. In the case of the display on another static medium, the original image can be printed on an object, projected by another projector, or displayed on an electronic paper, for example.

An external camera is used for photographing of an object. The camera preferably exhibits spatial resolution as high as possible. Except for calculation time, an illusory action can be instantaneously added to a static object located in front of eyes. As a projection unit 11a of a video projection device 4a which is an example of the present embodiment, a projector can be used. A commercially available projector may be used as this projector. However, in the case where the projector is used in a bright room, a projector emitting high luminance is required.

An ideal viewing distance varies depending on the size of an object. In the case where a motion is given to a video having 16 square centimeters by using the method of the present embodiment, for example, the viewing distance of approximately 1.5 meters is required. As an object is larger, the viewing distance is required to be set longer.

A gap may be generated between structures of a video and an object in the case where the video is projected onto a three-dimensional object, in the case where projection is performed without considering the depth of an object projection surface, and in the case where the depth difference on the object projection surface is large. It is more preferable to use an object whose depth difference on the projection surface is relatively small to enable projection within a range where a gap is not generated. Further, in the case where a video is projected onto a three-dimensional object having the large depth, a surface tilted toward the depth direction can be deformed illusorily by grasping the three-dimensional shape of the object and deforming videos to be projected in accordance with the shape.

According to the video display device of the present embodiment, an expression of a static face image can be changed illusorily or the direction of eyes can be changed illusorily, for example. Further, by changing a pattern of a motion, illusions can be provided that an object is flapping and that the object exists under flowing liquid. In the case where a video is projected onto an object which is a two-dimensional medium such as a printed material, a dynamic range of luminance of the object in the medium is generally narrow. However, a video having the dynamic range higher than that of the object is projected onto the object in a superimposed manner in the present embodiment, so that an illusory action can be added to the object while enhancing the image quality of an appearance of the object. Further, according to the video display device of the present embodiment, an illusory effect of a motion can be instantaneously added to a picture image photographed by a camera, except for processing time.

The video display device of the present embodiment is applicable for an exhibition technique in an art museum or a museum or as an element technique of attractions used in entertainment facilities. For example, characters for children printed on a static medium such as a paper can be visually moved.

In the previous technique, color difference motion components corresponding to a temporal frequency of a moving image are required so as to present the moving image. The configuration is described below which provides an illusion that an image is moving in a temporal frequency which is larger than a predetermined level without using a color difference of motion component having the temporal frequency which is larger than a predetermined level.

Human beings detect local motion components from a moving image by using a function like spatiotemporal filtering (Reference Literature 3: Watson, A. B., & Ahumada, A. J, "Model of human visual-motion sensing," Journal of the Optical Society of America, (1985), A, 2, 322-342). A function similar to this can be realized by image information processing in which motion components and static components are separately extracted from a moving image through a temporal frequency filter or the like.

It is known that human beings percept static image components, which are defined by colors or luminance contrast, while drawing the static image components toward luminance motion components ("Reference Literature 4: Ramachandran, V. S., "Interaction between colour and motion in human vision," Nature (1987), 328, 645-647." and "Reference Literature 5: Anstis, S., "Kinetic edges become displaced, segregated, and invisible," In D. M.-K. Lam (Ed.), Neural mechanisms of visual perception, Proceedings of the Second Retina Research Foundation Conference, Texas (1989): Portfolio Press, 247-260."). From this visual characteristics, it is considered possible to modulate an appearance of a picture image by luminance motion components in a moving image.

The human visual system is insensitive to a motion signal which is defined by a color signal, while the human visual system is sensitive to a motion signal which is defined by a luminance signal (Reference Literature 6: Ramachandran, V. S., & Gregory, R. L, "Does colour provide an input to human motion perception?" Nature (1978), 275, 55-56). In addition, spatial resolution of human beings with respect to an object which moves at a predetermined or higher velocity is lower than that with respect to a static object (Reference Literature 7: Kelly, D. H. (1979). Motion and vision. II. Stabilized spatio-temporal threshold surface. Journal of the Optical Society of America, 69, 1340-1349). That is, even if color components are eliminated from motion components of a moving image, the quality of a video which is perceived by human beings is not largely lowered.

In each embodiment, in the light of the above-mentioned perceptional characteristics of human beings, a "luminance motion component having a temporal frequency an absolute value of which is equal to or larger than the second value" is put on an "image having a temporal frequency an absolute value of which is equal to or smaller than the first value" and including a spatial frequency component an absolute value of which is larger than zero. Here, the "luminance motion component" is a component corresponding to the "image" and "the second value" is larger than "the first value". "Including a spatial frequency component an absolute value of which is larger than zero" represents including a spatial frequency component which is not zero. For example, when it is assumed that "the first value" is $F_1$ and "the second value" is $F_2$, $0 \leq F_1 < F_2$ is satisfied. $F_1 = 0$ may be accepted or $F_1 > 0$ may be accepted. An example of $F_1$ is an absolute value of a temporal frequency at which an "image" is perceived to be standing (for example, approximately zero). Here, $F_1$ may be a temporal frequency at which the "image" is perceived to be moving. In the case of $F_1 = 0$, the "image having a temporal frequency an absolute value of which is equal to or smaller than the first value" is a static image. In the case of $F_1 > 0$, the "image having a temporal frequency an absolute value of which is equal to or smaller than the first value" is an image which exhibits a motion having a frequency component the magnitude of which is equal to or smaller than the first value and moves more slowly than a "luminance motion component having a temporal frequency an absolute value of which is equal to or larger than the second value". The "image" may have only a single temporal frequency component (for example, 0 Hz) or may have several pieces of temporal frequency components (that is, may be a composition of images of several pieces of temporal frequencies). The "component having a temporal frequency an absolute value of which is equal to or smaller than the first value" is referred to as a "low temporal frequency component" and the "component having a temporal frequency an absolute value of which is equal to or larger than the second value" is referred to as a "high temporal frequency component" below. It is preferable that the "image" is not uniform and includes a spatial frequency component an absolute value of which is larger than zero (a spatial frequency component which is not zero). Both of a color difference component and a luminance component of the "image" may include a spatial frequency component an absolute value of which is larger than zero or one of the color difference component and the luminance component may include a spatial frequency component an absolute value of which is larger than zero. A human being who watches a video obtained by putting a "luminance motion component" on such "image" is given an illusion that the "image" is moving at a higher temporal frequency than a temporal frequency having the magnitude of "the first value" (dynamic illusion). For example, in the case where a "luminance motion component" is put on a static "image", an illusion that this "image" is moving is given to human beings. Here, "a frequency α is higher than a frequency β" represents that an absolute value |α| of the frequency α is larger than an absolute value |β| of the frequency β.

The "image" may be an achromatic (grayscale) image including only a luminance component or may be an image containing a chromatic color (color). Especially, in the case where a luminance motion component is put on the latter image, such illusion can be given that a chromatic image is moving at a higher frequency than a low temporal frequency component even though the chromatic image does not include a color difference component higher than the low temporal frequency component. The "image" may be a picture image (image information) which is an object of information processing or an image which is expressed on a surface of the object. Examples of the "image" which is expressed on a surface of an object include a picture image and a photograph which are "printed", "drawn", "displayed", or "projected" on the surface of the object, a pattern and a design based on a tone of color of materials constituting the surface of the object, a pattern based on a shape of the surface of the object (such as a design, a boundary line, and a shade), and the like. The "surface of the object" may be a flat surface, a curved surface, or an uneven surface. The "object" may be a thing having a three-dimensional shape (such as a vase, a ball, a model, and a building) or a thing which can be considered as a plane from the viewpoint of the application (such as a paper, a board, a wall, a screen, a picture plane, and a transmission type display).

In order to provide a large dynamic illusion, it is preferable that an "image" and a "luminance motion component" correspond to an identical "moving image". For example, an "image" corresponds to a component having a temporal frequency which is zero (temporal frequency=0 Hz) or approximately zero in "several pieces of frames" of a "moving image" and a "luminance motion component" corresponds to a luminance component having a temporal frequency an absolute value of which is positive (|temporal frequency|>0 Hz) in the "plurality of pieces of frames". Especially, in the case where a "moving image" includes a "periodic or repetitive motion component", the larger advantageous effect can be expected. The "periodic motion component" represents not only a component for performing the precisely-periodic motion but also a component for performing a motion with high periodicity. In a similar manner, the "repetitive motion component" represents not only a component for performing the precisely-repetitive motion but also a component for performing a highly-repetitive motion. In the case where a "moving image" includes a "periodic or repetitive motion component", an "image" may correspond to a static image in an arbitrary frame included in the "moving image". "A corresponds to B" may represent that A is B, A is derived from (is based on) B, or B is derived from A. "A is derived from B" may represent that A is obtained from B, A is obtained from a duplicate of B, or A is obtained from an approximation of B. For example, an "image" and a "luminance motion component" may be extracted from a "moving image" or a duplication of the moving image or a "moving image" may be generated from a static "image" which is taken by a camera or a scanner so as to extract a "luminance motion component" from the "moving image".

A function of motion vision is constant with respect to the luminance contrast which is equal to or larger than a predetermined value (Reference Literature 8: Pantie, A., & Sekuler, R. (1969). Contrast response of human visual mechanisms sensitive to orientation and direction of motion. Vision Research, 9, 397-406). Further, spatial resolution in motion view is lower than spatial resolution in perception with respect to a static image (Reference Literature 7). That is, even if spatial resolution and contrast of a luminance motion component which is extracted from a moving image are controlled and thus the quality of motion information itself is degraded, the quality of a moving image to be perceived is maintained. Accordingly, even if a component obtained by reducing a high spatial frequency component and contrast of a luminance motion component moving image which is contained in the "moving image" is set to be a "luminance motion component", a sufficient dynamic illusion can be created. Thus, the information amount can be reduced almost without reducing the degree of a dynamic illusion.

"A luminance motion component is put on an image" represents that "a luminance motion component is synthesized with an image", "a luminance motion component is superimposed on an image", "a luminance motion component is integrated with an image", "a luminance motion component is added to an image", "a luminance motion component is reflected on an image", "a luminance motion component is incorporated into an image", or "calculation including at least addition, multiplication, or exponentiation is applied to a pixel value of an image and a pixel value of a luminance motion component", for example. A specific method for "putting a luminance motion component on a picture image" will be described later.

Fifth Embodiment

Figure 13A:
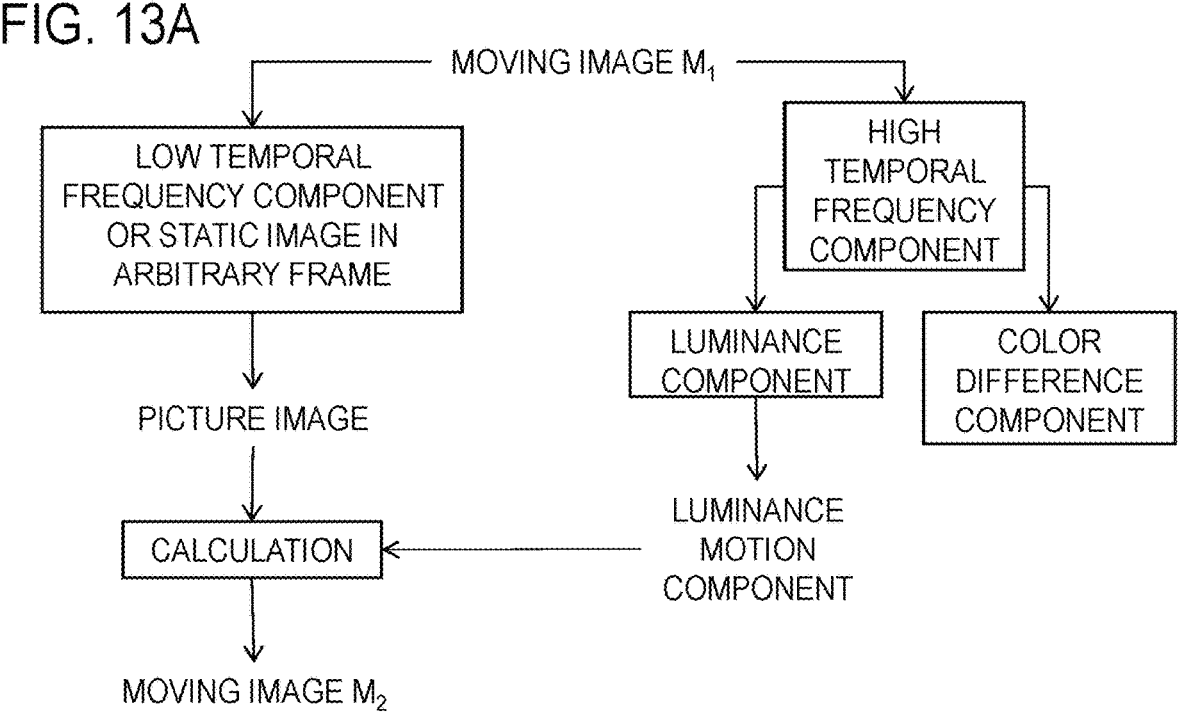
FIG. 13A and FIG. 13B are conceptual diagrams for illustrating an outline of processing.

In the present embodiment, a "low temporal frequency component" and a "high temporal frequency component" are extracted from a moving image $M_1$. A "low temporal frequency component" is defined as "a picture image (an image)" and a luminance component extracted from a "high temporal frequency component" is defined as a "luminance motion component". A color difference component of a "high temporal frequency component" is not used. Calculation for integrating (putting) a "luminance motion component" into (on) a "picture image" is performed and a moving image $M_2$ obtained through the calculation is displayed (FIG. 13A). Accordingly, the "picture image" and the "luminance motion component" are integrated with each other in the visual system of a human being who watches the moving image $M_2$ so as to create an illusion that the "picture image" is moving at a higher temporal frequency than the "low temporal frequency". Thus, even though a color difference component of the "high temporal frequency component" is eliminated from the moving image $M_1$, the quality of a video in perception is maintained.

<Configuration>

Figure 15:
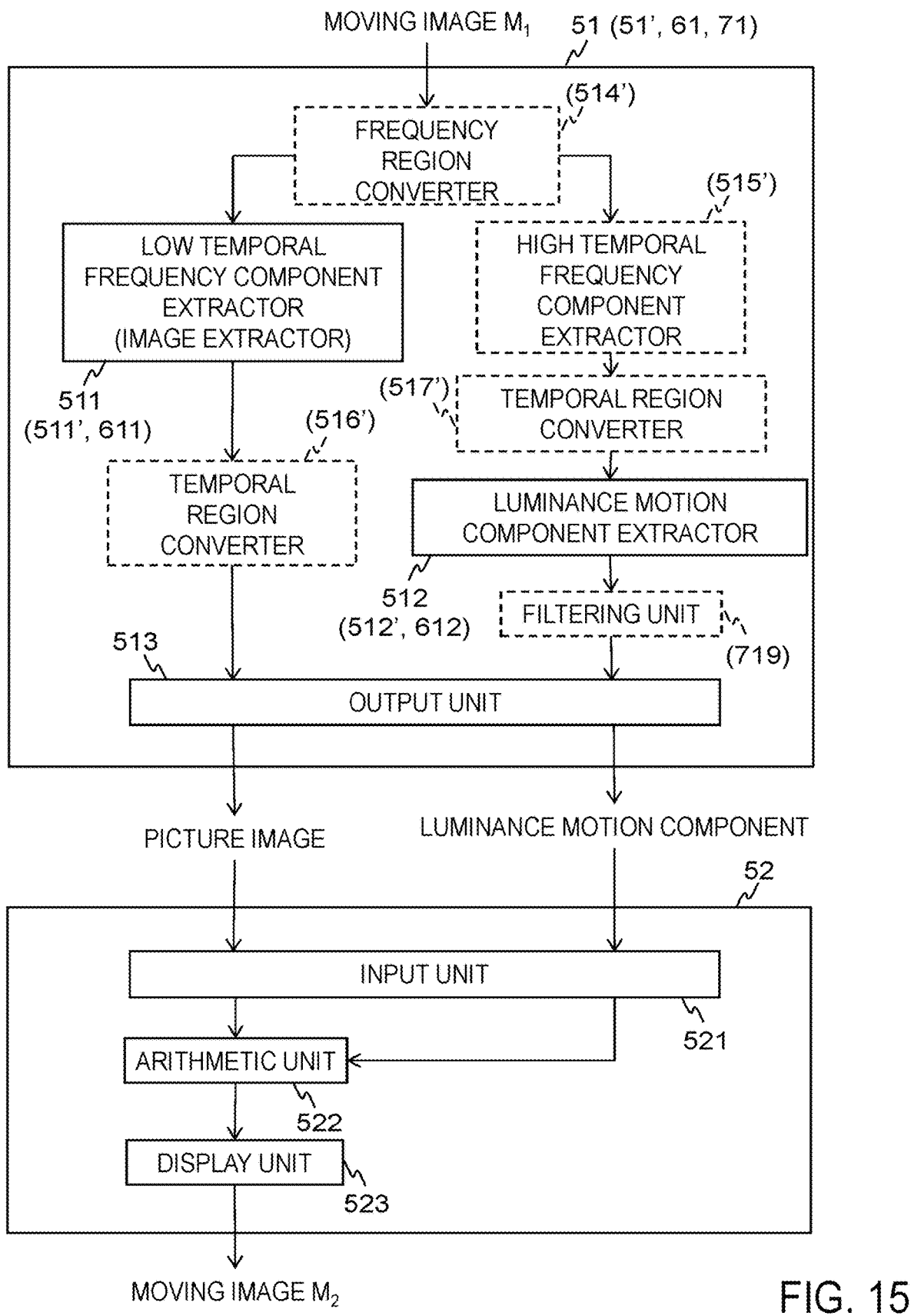
FIG. 15 is a block diagram illustrating the functional configuration of the embodiments.

As illustrated in FIG. 15, a moving image component extraction device 51 according to the present embodiment includes a low temporal frequency component extractor 511 (first processor), a luminance motion component extractor 512 (second processor), and an output unit 513. A dynamic illusion presentation device 52 (illusion presentation device) according to the present embodiment includes an input unit 521, an arithmetic unit 522, and a display unit 523. The moving image component extraction device 51 and the low temporal frequency component extractor 511 are devices which are configured when a predetermined program is read into a general-purpose or dedicated computer which is provided with a processor (hardware processor) such as a central processing unit (CPU), a memory such as a random-access memory (RAM) and a read-only memory (ROM), a display device such as a display, and the like. This computer may be provided with a single processor or a single memory or provided with several processors and several memories. This program may be installed on the computer or may be recorded in the ROM or the like in advance. A part or the whole processing unit may be configured not by an electronic circuit (circuitry) which realizes the functional configuration when a program is read in such as a CPU but by an electronic circuit which realizes the processing function without using a program. Further, an electronic circuit constituting a single piece of device may include several CPUs.

<Processing>

Figure 16:
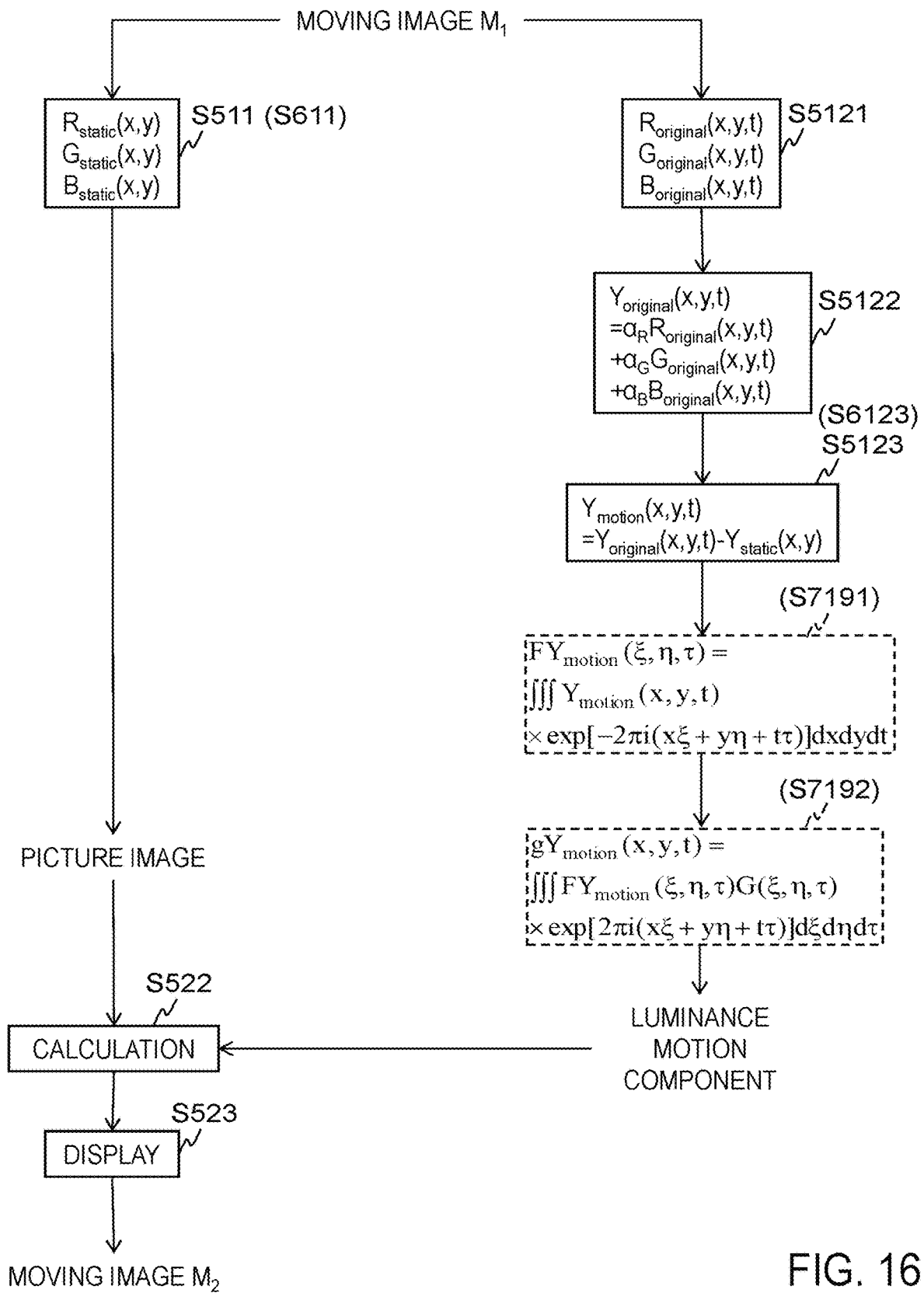
FIG. 16 is a flow diagram illustrating processing of the embodiments.

Processing according to the present embodiment is described with reference to FIG. 16. A moving image $M_1$ according to the present embodiment is a color moving image including a chromatic color and is composed of pixel values representing intensity change of the R channel, the G channel, and the B channel (Formula (1)).

$$M_1 = \begin{cases} \{R(x, y, t)\} \\ \{G(x, y, t)\} \\ \{B(x, y, t)\} \end{cases} \quad (1)$$

where $\{R(x,y,t)\}$, $\{G(x,y,t)\}$, and $\{B(x,y,t)\}$ are three-dimensional matrices including two-dimensional information for space and one-dimensional information for time which respectively have pixel values $R(x,y,t)$, $G(x,y,t)$, and $B(x,y,t)$ as elements. The pixel values $R(x,y,t)$, $G(x,y,t)$, and $B(x,y,t)$ respectively represents the intensity of the R channel, the intensity of the G channel, and the intensity of the B channel on a horizontal position x, a vertical position y, and a frame number t. x, y, and t are integers respectively representing a horizontal position, a vertical position, and a frame number in the case where a moving image is expressed by a three-dimensional coordinate system. A lower limit and an upper limit of a horizontal position are respectively denoted as $x_{min}$ and $x_{max}$ ($x_{min}<x_{max}$), a lower limit and an upper limit of a vertical position are set as $y_{min}$, and $y_{max}$ ($y_{min}<y_{max}$), and a lower limit and an upper limit of a frame number are respectively denoted as $t_{min}$ and $t_{max}$ ($t_{min}<t_{max}$). x, y, and t satisfy $x_{min} \leq x \leq x_{max}$, $y_{min} \leq y \leq y_{max}$, and $t_{min} \leq t \leq t_{max}$ respectively. It is preferable that the moving image $M_1$ has frames (non-uniform frames) having spatial frequency components an absolute value of which is larger than zero (spatial frequency components which are not zero).

The pixel values $R(x,y,t)$, $G(x,y,t)$, and $B(x,y,t)$ constituting the moving image $M_1$ (where $x_{min} \leq x \leq x_{max}$, $y_{min} \leq y \leq y_{max}$, and $t_{min} \leq t \leq t_{max}$) are input into the low temporal frequency component extractor 511 and the luminance motion component extractor 512 of the moving image component extraction device 51 (FIG. 15).

The low temporal frequency component extractor 511 acquires static components $R_{static}(x,y)$, $G_{static}(x,y)$, and $B_{static}(x,y)$ from the pixel values $R(x,y,t)$, $G(x,y,t)$, and $B(x,y,t)$ (where $x_{min} \leq x \leq x_{max}$, $y_{min} \leq y \leq y_{max}$, and $t_{min} \leq t \leq t_{max}$) so as to output the static components $R_{static}(x,y)$, $G_{static}(x,y)$, and $B_{static}(x,y)$ In the present embodiment, temporal average values of the pixel values $R(x,y,t)$, $G(x,y,t)$, and $B(x,y,t)$ are set as $R_{static}(x,y)$, $G_{static}(x,y)$, and $B_{static}(x,y)$ respectively (Formula (2)).

$$R_{static}(x,y) = \text{Mean}[R(x,y,t)]_{t_{min} \leq t \leq t_{max}}$$

$$G_{static}(x,y) = \text{Mean}[G(x,y,t)]_{t_{min} \leq t \leq t_{max}}$$

$$B_{static}(x,y) = \text{Mean}[B(x,y,t)]_{t_{min} \leq t \leq t_{max}} \quad (2)$$

where $\text{Mean}[x(t)]_{a \leq t \leq b}$ represents an average value of $x(a), \ldots, x(b)$.

The low temporal frequency component extractor 511 outputs a static image $M_{static}$ (Formula (3)) composed of two-dimensional matrices $\{R_{static}(x,y)\}$, $\{G_{static}(x,y)\}$, and $\{B_{static}(x,y)\}$ which have $R_{static}(x,y)$, $G_{static}(x,y)$, and $B_{static}(x,y)$ (where $x_{min} \leq x \leq x_{max}$ and $y_{min} \leq y \leq y_{max}$) respectively as elements.

$$M_{static} = \begin{cases} \{R_{static}(x,y)\} \\ \{G_{static}(x,y)\} \\ \{B_{static}(x,y)\} \end{cases} \quad (3)$$

The image $M_{static}$ is a component a temporal frequency of which is zero in several pieces of frames t ($t_{min} \leq t \leq t_{max}$) of the moving image $M_1$ and is an example of an "image having a temporal frequency an absolute value of which is equal to or smaller than the first value" in the case where "the first value" is set to be 0. It is preferable that the image $M_{static}$ includes a spatial frequency component an absolute value of which is larger than zero and contains a chromatic color (step S511).

The luminance motion component extractor 512 sets the pixel values R(x,y,t), G(x,y,t), and B(x,y,t) as $R_{original}(x,y,t)$, $G_{original}(x,y,t)$, and $B_{original}(x,y,t)$ respectively (step S5121) and applies weight addition to $R_{original}(x,y,t)$, $G_{original}(x,y,t)$, and $B_{original}(x,y,t)$ depending on degrees, at which respective colors contribute for luminance, so as to obtain a luminance component $Y_{original}(x,y,t)$ (where $x_{min} \leq x \leq x_{max}$, $y_{min} \leq y \leq y_{max}$, and $t_{min} \leq t \leq t_{max}$) of the moving image $M_1$ (step S5122) (Formula (4)).

$$Y_{original}(x,y,t) = \alpha_R R_{original}(x,y,t) + \alpha_G G_{original}(x,y,t) + \alpha_B B_{original}(x,y,t) \quad (4)$$

where $\alpha_R$, $\alpha_G$, and $\alpha_B$ are weight coefficients (constants) (for example, $\alpha_R=0.299$, $\alpha_G=0.587$, and $\alpha_B=0.114$).

Further, the luminance motion component extractor 512 subtracts the luminance static component $Y_{static}(x,y)$ from the luminance component $Y_{original}(x,y,t)$ of each frame t so as to obtain and output the luminance motion component $Y_{motion}(x,y,t)$ (Formula (5)). The luminance static component $Y_{static}(x,y)$ is obtained by time-averaging the luminance component $Y_{original}(x,y,t)$ (where $x_{min} \leq x \leq x_{max}$, $y_{min} \leq y \leq y_{max}$, and $t_{min} \leq t \leq t_{max}$).

$$Y_{motion}(x,y,t) = Y_{original}(x,y,t) - Y_{static}(x,y) \quad (5)$$

The luminance motion component $Y_{motion}(x,y,t)$ is a luminance component having a temporal frequency an absolute value of which is positive in several pieces of frames t ($t_{min} \leq t \leq t_{max}$) of the moving image $M_1$ and is an example of a "luminance motion component having a temporal frequency an absolute value of which is equal to or larger than the second value". This luminance motion component is a component corresponding to an image and the second value is larger than the first value (step S5123).

Figure 18A:
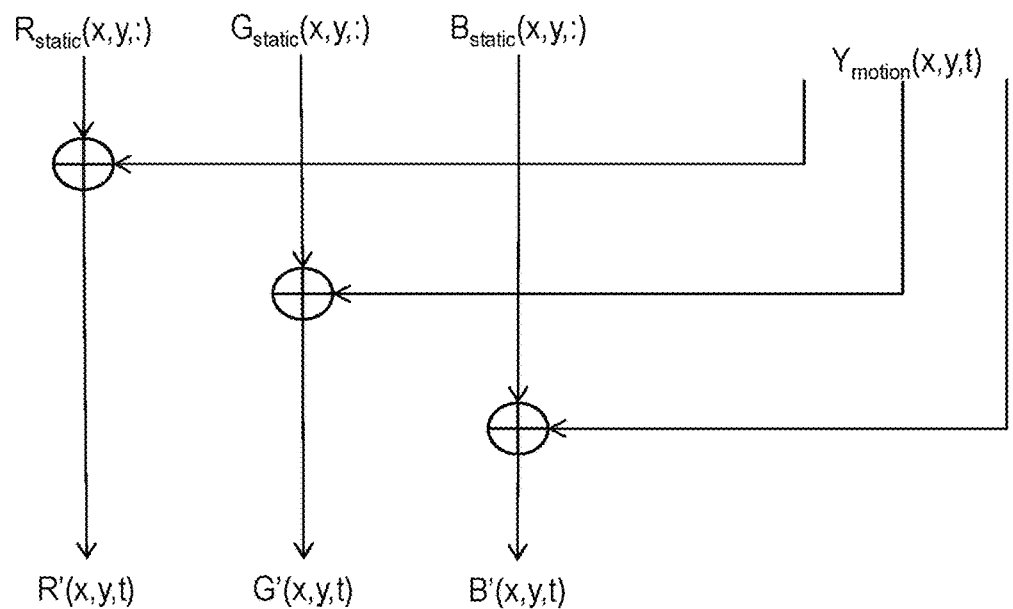
FIG. 18A and FIG. 18B are diagrams for illustrating a method for putting a luminance motion component on a picture image.

The image $M_{static}$ and the luminance motion component $Y_{motion}(x,y,t)$ (where $x_{min} \leq x \leq x_{max}$, $y_{min} \leq y \leq y_{max}$, and $t_{min} \leq t \leq t_{max}$) are input into the output unit 513 to be transferred to the dynamic illusion presentation device 52. The image $M_{static}$ and the luminance motion component $Y_{motion}(x,y,t)$ are input into the input unit 521 of the dynamic illusion presentation device 52 to be transferred to the arithmetic unit 522. The arithmetic unit 522 acquires and outputs a moving image $M_2$ obtained by putting the luminance motion component $Y_{motion}(x,y,t)$ on the image $M_{static}$. For example, the arithmetic unit 522 adds the luminance motion component $Y_{motion}(x,y,t)$ to each of the static components $R_{static}(x,y)$, $G_{static}(x,y)$, and $B_{static}(x,y)$ (where $x_{min} \leq x \leq x_{max}$ and $y_{min} \leq y \leq y_{max}$) of the image $M_{static}$ so as to obtain the moving image $M_2$ (FIG. 18A, Formula (6))

$$M_2 = \begin{cases} \{R'_{motion}(x,y,t)\} = \{R_{static}(x,y) + Y_{motion}(x,y,t)\} \\ \{G'_{motion}(x,y,t)\} = \{G_{static}(x,y) + Y_{motion}(x,y,t)\} \\ \{B'_{motion}(x,y,t)\} = \{B_{static}(x,y) + Y_{motion}(x,y,t)\} \end{cases} \quad (6)$$

Figure 18B:
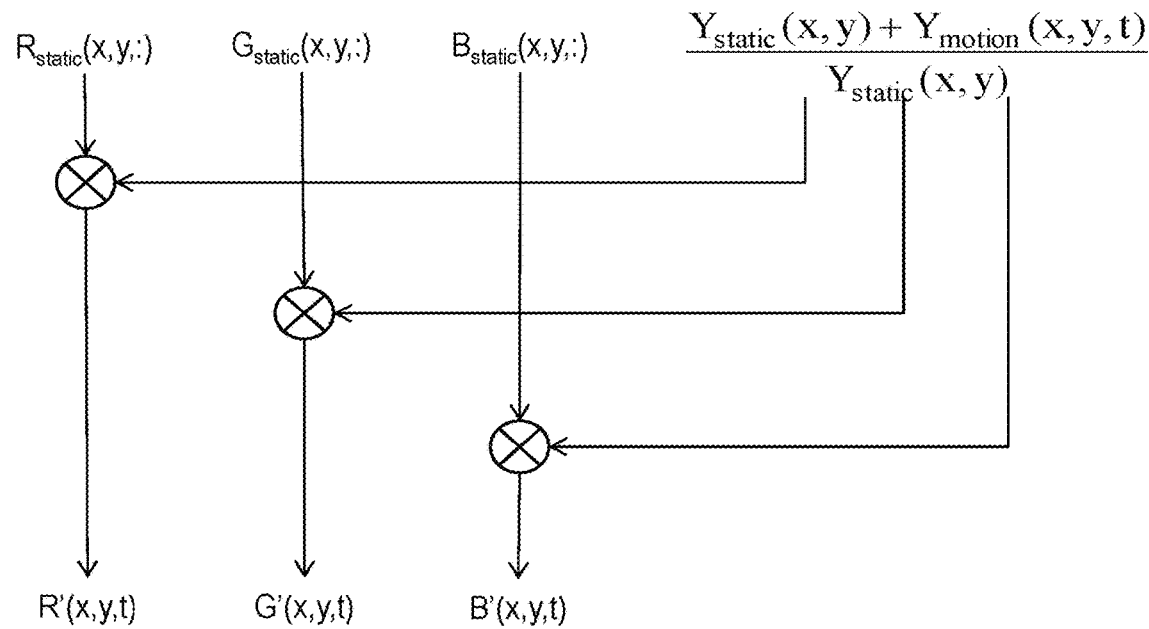

Accordingly, the moving image $M_2$ obtained by eliminating color motion information from the moving image $M_1$ can be generated (step S522). Here, in the case of Formula (6), the chromaticity (a ratio of RGB) of each pixel of the moving image $M_2$ slightly varies from the moving image $M_1$ (original moving image). However, the human visual characteristics are generally insensitive to color change and the apparent quality of the moving image $M_2$ does not deteriorate compared to the moving image $M_1$. When the chromaticity of each pixel is desired to be saved, each of the RGB channels may be multiplied by the modulation ratio $Y'_{motion}(x,y,t)$ based on a motion of the luminance static component $Y_{static}(x,y)$ (Formula (7), FIG. 18B).

$$M_2 = \begin{cases} \{R'_{motion}(x,y,t)\} = \{R_{static}(x,y) Y'_{motion}(x,y,t)\} \\ \{G'_{motion}(x,y,t)\} = \{G_{static}(x,y) Y'_{motion}(x,y,t)\} \\ \{B'_{motion}(x,y,t)\} = \{B_{static}(x,y) Y'_{motion}(x,y,t)\} \end{cases} \quad (7)$$

$$Y'_{motion}(x,y,t) = \frac{Y_{static}(x,y) + Y_{motion}(x,y,t)}{Y_{static}(x,y)}$$

In this case, the ratio among the intensity of the RGB channels is maintained, so that a luminance motion component without modulation of a color signal can be synthesized (step S522). That is, in the present embodiment, a video ($Y_{motion}(x,y,t)$ or $Y'_{motion}(x,y,t)$) is superimposed on an object in order that the object ($M_{static}$) will be perceived as if the object ($M_{static}$) were given a motion. This video is a video including a luminance motion component corresponding to a motion given to the object (for example, a video including only a luminance component). Further, as illustrated in Formula (6) and Formula (7), the video is superimposed on the object so that a region of the object ($M_{static}$) and a region, which corresponds to a motion given to the object, in the video ($Y_{motion}(x,y,t)$ or $Y'_{motion}(x,y,t)$) are overlapped with each other. Further, an absolute value of a temporal frequency of the luminance motion component in several pieces of frames t in the video is larger than an absolute value of a temporal frequency in several pieces of frames in the video corresponding to the object.

The moving image $M_2$ thus obtained is input into the display unit 523 so as to be displayed from there (step S523). Even though the moving image $M_2$ does not include a motion component of a color signal, an illusion of a motion is provided. That is, even though a color motion component is eliminated from the moving image $M_1$, a visual experience comparable to the original moving image can be provided to a user.

Modification 1 of Fifth Embodiment

The processing for separating and extracting each component from the moving image $M_1$ can be realized also by converting the moving image $M_1$ into a temporal frequency region by Fourier transform or the like and performing temporal frequency filtering. Hereinafter, differences with the above-described matters will be focused and described. Descriptions of the matters which have already been described will be sometimes omitted by using the same reference characters.

<Configuration>

As illustrated in FIG. 15, a moving image component extraction device 51' according to the present embodiment includes a frequency region converter 514', a low temporal frequency component extractor 511' (first processor), a high temporal frequency component extractor 515', a luminance motion component extractor 512' (second processor), temporal region converters 516' and 517', and an output unit 513. The dynamic illusion presentation device 52 is identical to that of the fifth embodiment. The moving image component extraction device 51' is configured when a predetermined program is read into a computer as that described above, for example.

<Processing>

Figure 17:
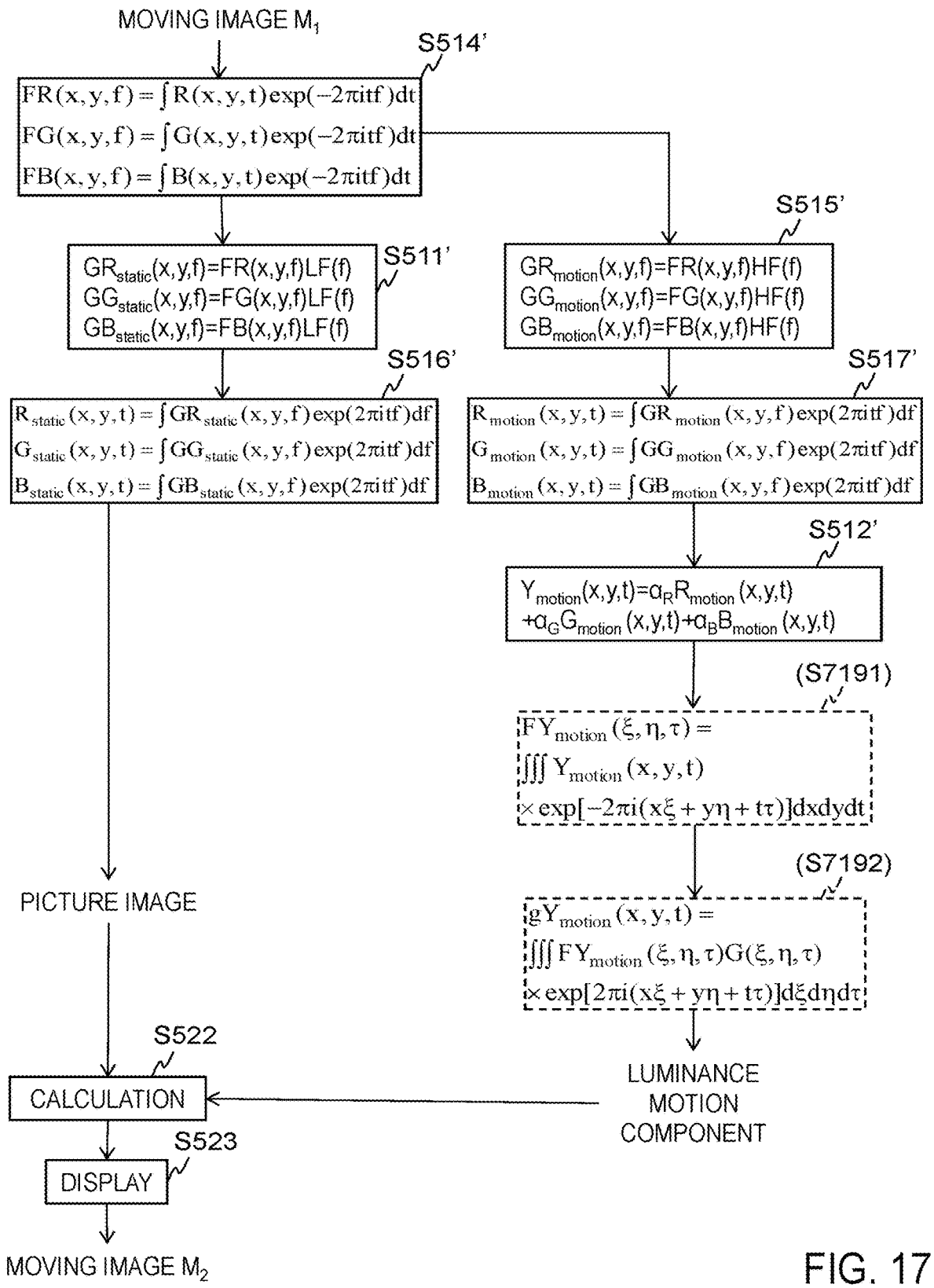
FIG. 17 is a flow diagram illustrating processing of the embodiments.

Processing according to the present modification is described with reference to FIG. 17. The above-described pixel values R(x,y,t), G(x,y,t), and B(x,y,t) constituting the moving image $M_1$ (where $x_{min} \leq x \leq x_{max}$, $y_{min} \leq y \leq y_{max}$, and $t_{min} \leq t \leq t_{max}$) are input into the frequency region converter 514'. The frequency region converter 514' converts the pixel values R(x,y,t), G(x,y,t), and B(x,y,t) into temporal frequency regions so as to obtain values FR(x,y,f), FG(x,y,f), and FB(x,y,f) of the temporal frequency regions. An example in which Fourier transform is used is described below (Formula (8)).

$$FR(x,y,f) = \int R(x,y,t) \exp(-2\pi i t f) dt$$

$$FG(x,y,f) = \int G(x,y,t) \exp(-2\pi i t f) dt$$

$$FB(x,y,f) = \int B(x,y,t) \exp(-2\pi i t f) dt \qquad (8)$$

In this case, FR(x,y,f), FG(x,y,f), and FB(x,y,f) are Fourier spectra on the dimension t corresponding to R(x,y,t), G(x,y,t), and B(x,y,t) (where $x_{min} \leq x \leq x_{max}$, $y_{min} \leq y \leq y_{max}$, and $t_{min} \leq t \leq t_{max}$). Though the integration range of Formula (8) is from $-\infty$ to $+\infty$, calculation may be actually performed only with respect to a limited interval $t_{min} \leq t \leq t_{max}$. Further, R(x,y,t), G(x,y,t), and B(x,y,t) are discrete values, so that discrete Fourier transform may be used. f denotes an integer index representing a temporal frequency. f=0 represents that a temporal frequency is 0 Hz and larger f represents a higher temporal frequency (temporal frequency an absolute value of which is larger). When an upper limit of |f| is denoted as $f_{max}$, $0 \leq |f| \leq f_{max}$ is satisfied. Further, i denotes an imaginary unit and π denotes a circumference ratio. FR(x,y,f), FG(x,y,f), and FB(x,y,f) (where $x_{min} \leq x \leq x_{max}$, $y_{min} \leq y \leq y_{max}$, $t_{min} \leq t \leq t_{max}$, and $0 \leq |f| \leq f_{max}$) are transferred to the low temporal frequency component extractor 511' and the high temporal frequency component extractor 515' (step S514').

The low temporal frequency component extractor 511' multiplies FR(x,y,f), FG(x,y,f), and FB(x,y,f) by a low-pass filter LF(f) so as to obtain and output $GR_{static}$(x,y,f), $GG_{static}$(x,y,f), and $GB_{static}$(x,y,f) (Formula (9)).

$$GR_{static}(x,y,f) = FR(x,y,f) LF(f)$$

$$GG_{static}(x,y,f) = FG(x,y,f) LF(f)$$

$$GB_{static}(x,y,f) = FB(x,y,f) LF(f) \qquad (9)$$

where the low-pass filter LF(f) is expressed by Formula (10).

$$LF(f) = \begin{cases} 1 & \text{for } |f| \leq k \\ 0 & \text{otherwise} \end{cases} \qquad (10)$$

where k denotes a constant which is equal to or larger than 0. In the case of k=0, the low-pass filter LF(f) extracts a component having a temporal frequency of 0 Hz. In the case of k>0, the low-pass filter LF(f) extracts a component having a temporal frequency an absolute value of which is equal to or smaller than that of a temporal frequency corresponding to k (step S511').

$GR_{static}$(x,y,f), $GG_{static}$(x,y,f), and $GB_{static}$(x,y,f) are input into the temporal region converter 516'. The temporal region converter 516' converts $GR_{static}$(x,y,f), $GG_{static}$(x,y,f), and $GB_{static}$(x,y,f) into temporal regions so as to obtain low temporal frequency components $R_{static}$(x,y,t), $G_{static}$(x,y,t), and $B_{static}$(x,y,t). An example in which inverse Fourier transform is used is described below (Formula (11)).

$$R_{static}(x,y,t) = \int GR_{static}(x,y,f) \exp(2\pi i t f) df$$

$$G_{static}(x,y,t) = \int GG_{static}(x,y,f) \exp(2\pi i t f) df$$

$$B_{static}(x,y,t) = \int GB_{static}(x,y,f) \exp(2\pi i t f) df \qquad (11)$$

Though the integration range of Formula (11) is from $-\infty$ to $+\infty$, calculation may be actually performed only with respect to a limited interval $0 \leq |f| \leq f_{max}$. Further, inverse discrete Fourier transform may be used. The temporal region converter 516' outputs a picture image (image) $M_{static}$ including low temporal frequency components below.

$$M_{static} = \begin{cases} \{R_{static}(x, y, t)\} \\ \{G_{static}(x, y, t)\} \\ \{B_{static}(x, y, t)\} \end{cases} \qquad (12)$$

This image $M_{static}$ is an example of an "image having a temporal frequency an absolute value of which is equal to or smaller than the first value". In the case where k=0 is set in Formula (10), $R_{static}$(x,y,t), $G_{static}$(x,y,t), and $B_{static}$(x,y,t) are respectively temporal average values of R(x,y,t), G(x,y,t), and B(x,y,t) and the $M_{static}$ is a static picture image. The image $M_{static}$ in this case is composed of components a temporal frequency of which is zero in several pieces of frames ($t_{min} \leq t \leq t_{max}$) of the moving image $M_1$. In the case where k>0 is set in Formula (10), $M_{static}$ is a picture image which includes components of a slow action (step S516').

The high temporal frequency component extractor 515' multiplies FR(x,y,f), FG(x,y,f), and FB(x,y,f) by a high-pass filter HF(f) so as to obtain and output $GR_{motion}$(x,y,f), $GG_{motion}$(x,y,f), and $GB_{motion}$(x,y,f) (where $x_{min} \leq x \leq x_{max}$, $y_{min} \leq y \leq y_{max}$, and $t_{min} \leq t \leq t_{max}$, and $0 \leq |f| \leq f_{max}$) (Formula (13)).

$$GR_{motion}(x,y,f) = FR(x,y,f) HF(f)$$

$$GG_{motion}(x,y,f) = FG(x,y,f) HF(f)$$

$$GB_{motion}(x,y,f) = FB(x,y,f) HF(f) \qquad (13)$$

where the high-pass filter HF(f) is expressed by Formula (14).

$$HF(f) = \begin{cases} 1 & \text{for } |f| \leq k \\ 0 & \text{otherwise} \end{cases} \qquad (14)$$

h denotes a constant which is equal to or larger than 0. In the case of h=0, the high-pass filter HF(f) extracts a component having a temporal frequency an absolute value of which is positive. In the case of h>0, the high-pass filter HF(f) extracts a temporal frequency component having a temporal frequency an absolute value of which is larger than that of a temporal frequency corresponding to h. It is preferable that h is equal to or larger than k. k and h do not necessarily have to be equal to each other. In the case where k and h are set to be equal to each other, the low-pass filter LF(f) and the high-pass filter HF(f) are complementary to each other. In this case, instead of the use of the high-pass filter HF(f), components which are not removed in the low temporal frequency component extractor 511' may be set to be $GR_{motion}(x,y,f)$, $GG_{motion}(x,y,f)$, and $GB_{motion}(x,y,f)$. That is, $$GR_{motion}(x,y,f)=FR(x,y,f)-GR_{static}(x,y,f)$$

$$GG_{motion}(x,y,f)=FG(x,y,f)-GG_{static}(x,y,f)$$

$$GB_{motion}(x,y,f)=FB(x,y,f)-GB_{static}(x,y,f) \quad (15)$$

may be set (step S515').

$GR_{motion}(x,y,f)$, $GG_{motion}(x,y,f)$, and $GB_{motion}(x,y,f)$ are input into the temporal region converter 517'. The temporal region converter 517' converts $GR_{motion}(x,y,f)$, $GG_{motion}(x,y,f)$, and $GB_{motion}(x,y,f)$ into temporal regions so as to obtain and output high temporal frequency components $R_{motion}(x,y,t)$, $G_{motion}(x,y,t)$, and $B_{motion}(x,y,t)$ (where $x_{min} \leq x \leq x_{max}$, $y_{min} \leq y \leq y_{max}$, and $t_{min} \leq t \leq t_{max}$). An example in which inverse Fourier transform is used is described below (Formula (16)).

$$R_{motion}(x,y,t)=\int GR_{motion}(x,y,f)\exp(2\pi itf)df$$

$$G_{motion}(x,y,t)=\int GG_{motion}(x,y,f)\exp(2\pi itf)df$$

$$B_{motion}(x,y,t)=\int GB_{motion}(x,y,f)\exp(2\pi itf)df \quad (16)$$

Though the integration range of Formula (16) is from $-\infty$ to $+\infty$, calculation may be actually performed only with respect to a limited interval $0 \leq |f| \leq f_{max}$. Further, inverse discrete Fourier transform may be used (step S517').

The luminance motion component extractor 512' applies weight addition to $R_{motion}(x,y,t)$, $G_{motion}(x,y,t)$, and $B_{motion}(x,y,t)$ so as to obtain and output the luminance component $Y_{original}(x,y,t)$ (where $x_{min} \leq x \leq x_{max}$, $y_{min} \leq y \leq y_{max}$, and $t_{min} \leq t \leq t_{max}$) of the moving image $M_1$ (step S512') (Formula (17)).

$$Y_{motion}(x,y,t)=\alpha_R R_{motion}(x,y,t)+\alpha_G G_{motion}(x,y,t)+\alpha_B B_{motion}(x,y,t) \quad (17)$$

where $\alpha_R$, $\alpha_G$, and $\alpha_B$ are weight coefficients (constants). The luminance motion component $Y_{motion}(x,y,t)$ is an example of a "luminance motion component having a temporal frequency an absolute value of which is equal to or larger than the second value".

The following processing is same as that of the fifth embodiment. In the present embodiment, an illusion that the moving image $M_2$ is moving at the higher temporal frequency than the image $M_{static}$ can be provided to a user.

Modification 2 of Fifth Embodiment

Figure 13B:
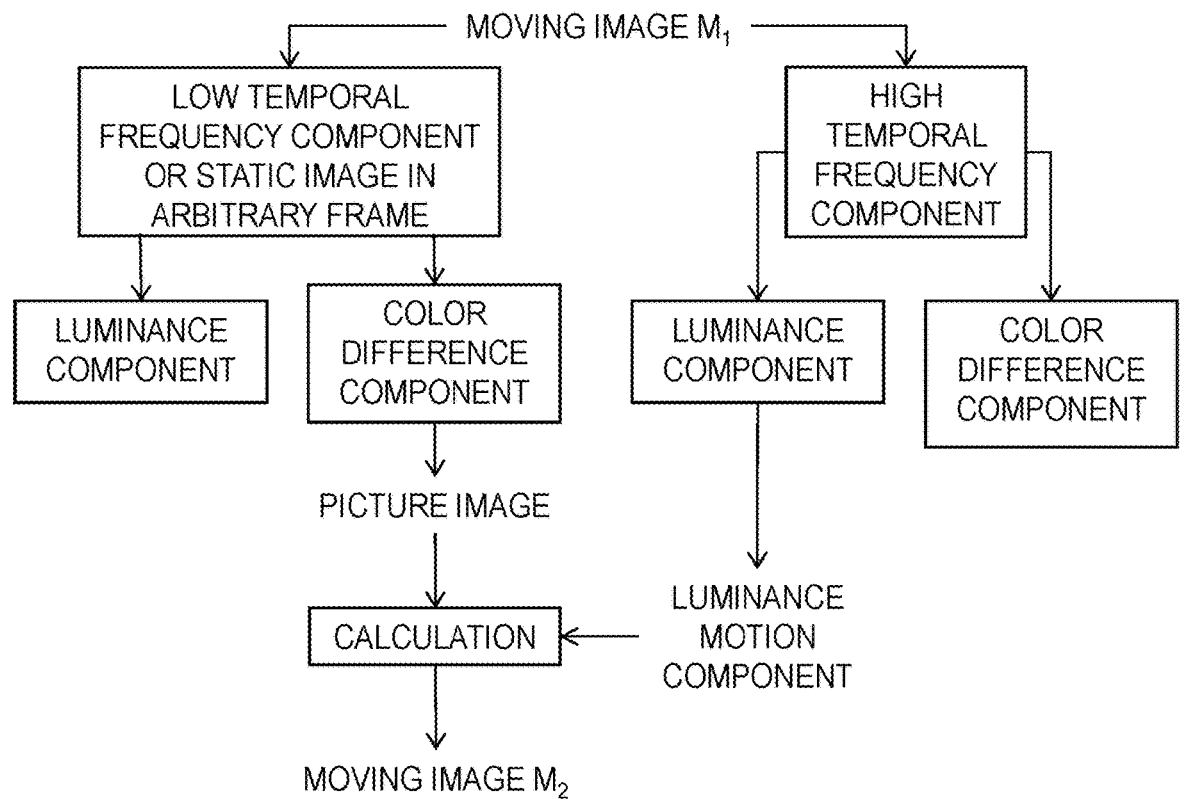
Figure 14A:
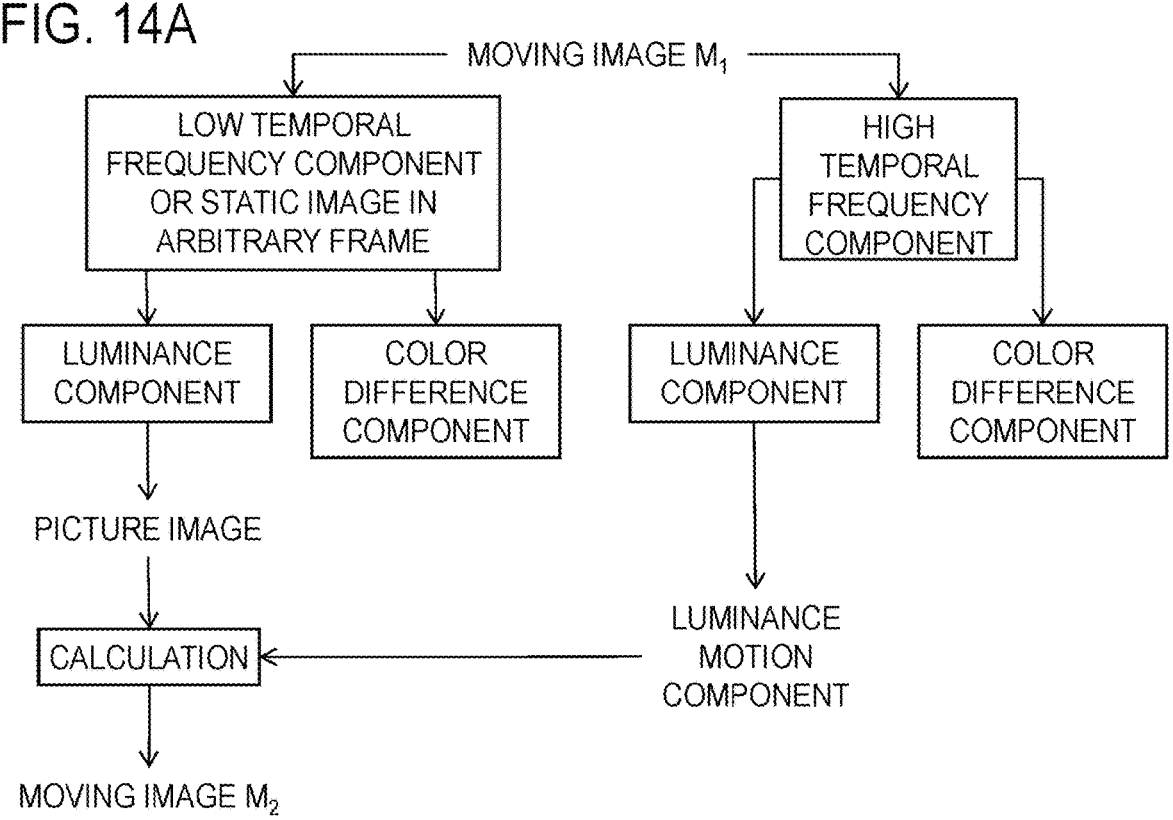
FIG. 14A and FIG. 14B are conceptual diagrams for illustrating an outline of processing.

In the fifth embodiment and modification 1 of the fifth embodiment, the moving image $M_2$ is generated which is obtained by putting a luminance motion component extracted from a high temporal frequency component of the moving image $M_1$ on the image $M_{static}$ composed of a low temporal frequency component of the moving image $M_1$ (FIG. 13A). However, the moving image $M_2$ may be generated which is obtained by putting a luminance motion component extracted from a high temporal frequency component of the moving image $M_1$ on the image $M_{static}$ of a color component which is defined based on a "color difference component" extracted from a low temporal frequency component of the moving image $M_1$ (FIG. 13B). Alternatively, the moving image $M_2$ may be generated which is obtained by putting a luminance motion component extracted from a high temporal frequency component of the moving image $M_1$ on the image $M_{static}$ composed of a "luminance component" extracted from a low temporal frequency component of the moving image $M_1$ (FIG. 14A). Even such moving image $M_2$ can provide a dynamic illusion. Further, the moving image $M_1$ may be a grayscale moving image.

Sixth Embodiment

In the case where the moving image $M_1$ includes a periodical or repetitive motion component (for example, a small action), a static image in an arbitrary frame (for example, the t=n-th frame) included in the moving image $M_1$ may be used as a "picture image" (FIG. 13A). That is, the moving image $M_2$ may be generated which is obtained by putting a luminance motion component on a static image of an arbitrary frame extracted from the moving image $M_1$. An illusion that a static image is looked moving can be provided by such moving image $M_2$ as well.

<Configuration>

As illustrated in FIG. 15, a moving image component extraction device 61 according to the present embodiment includes an image extractor 611 (first processor), a luminance motion component extractor 612 (second processor), and an output unit 513. The dynamic illusion presentation device 52 is identical to that of the fifth embodiment. The moving image component extraction device 61 is configured when a predetermined program is read into a computer as that described above, for example.

<Processing>

Processing according to the present embodiment is described with reference to FIG. 16. The difference from the fifth embodiment is that step S611 is executed instead of step S511 and step S6123 is executed instead of step S5123. Hereinafter, only step S611 and step S6123 which are the differences will be described.

«Step S611»

The moving image $M_1$ (Formula (1)) is input into the image extractor 611 and the luminance motion component extractor 612. The image extractor 611 extracts a static image of the t=n-th frame from the moving image $M_1$ and outputs the static image as the image $M_{static}$. That is, the image $M_{static}$ (Formula (3)) composed of two-dimensional matrices $\{R_{static}(x,y)\}$, $\{G_{static}(x,y)\}$, and $\{B_{static}(x,y)\}$ which have $R_{static}(x,y)=R(x,y,n)$, $G_{static}(x,y)=G(x,y,n)$, and $B_{static}(x,y)=B(x,y,n)$ ($x_{min} \leq x \leq x_{max}$ and $y_{min} \leq y \leq y_{max}$) respectively as elements is outputted. The image $M_{static}$ of the present embodiment is also an example of an "image having a temporal frequency an absolute value of which is equal to or smaller than the first value" in the case where "the first value" is set to be 0. It is preferable that the image $M_{static}$ includes a spatial frequency component an absolute value of which is larger than zero and contains a chromatic color (step S611).

«Step S6123»

The luminance motion component extractor 612 sets luminance components corresponding to $R_{static}(x,y)$, $G_{static}(x,y)$, and $B_{static}(x,y)$ (where $x_{min} \leq x \leq x_{max}$ and $y_{min} \leq y \leq y_{max}$) to be the luminance static component $Y_{static}(x,y)$ The luminance static component $Y_{static}(x,y)$ is obtained by applying weight addition to $R_{static}(x,y)$, $G_{static}(x,y)$, and $B_{static}(x,y)$ as is the case with step S5122. The luminance motion component extractor 612 subtracts the luminance static component $Y_{static}(x,y)$ from the luminance component $Y_{original}(x,y,t)$ of each frame t so as to obtain and output the luminance motion component $Y_{motion}(x,y,t)$ (where $x_{min} \leq x \leq x_{max}$, $y_{min} \leq y \leq y_{max}$, and $t_{min} \leq t \leq t_{max}$) (step S6123) (Formula (5)). That is, a video ($Y_{motion}(x,y,t)$) of the present embodiment includes a luminance motion component which is obtained by subtracting the luminance static component $Y_{static}(x,y)$, which is obtained from a static image based on a video corresponding to an object, from the luminance component $Y_{original}(x,y,t)$ of each of several pieces of frames in the video corresponding to the object.

In the present embodiment, an illusion that a single static image of an arbitrary frame is visually moving can be provided by a luminance motion component and a visual experience comparable to the original moving image can be provided to a user.

Modification of Sixth Embodiment

In the present embodiment, the moving image $M_2$ is generated which is obtained by putting a luminance motion component extracted from a high temporal frequency component of the moving image $M_1$ on the static image $M_{static}$ of an arbitrary frame of the moving image $M_1$ (FIG. 13A). However, the moving image $M_2$ may be generated which is obtained by putting a luminance motion component extracted from a high temporal frequency component of the moving image $M_1$ on a picture image of a color component which is defined based on a "color difference component" extracted from the static image $M_{static}$ of an arbitrary frame of the moving image $M_1$ (FIG. 13B). Alternatively, the moving image $M_2$ may be generated which is obtained by putting a luminance motion component extracted from a high temporal frequency component of the moving image $M_1$ on a picture image composed of a "luminance component" extracted from the static image $M_{static}$ of an arbitrary frame of the moving image $M_1$ (FIG. 14A). Even such moving image $M_2$ can provide a dynamic illusion. Further, the moving image $M_1$ may be a grayscale moving image.

Seventh Embodiment

Figure 14B:
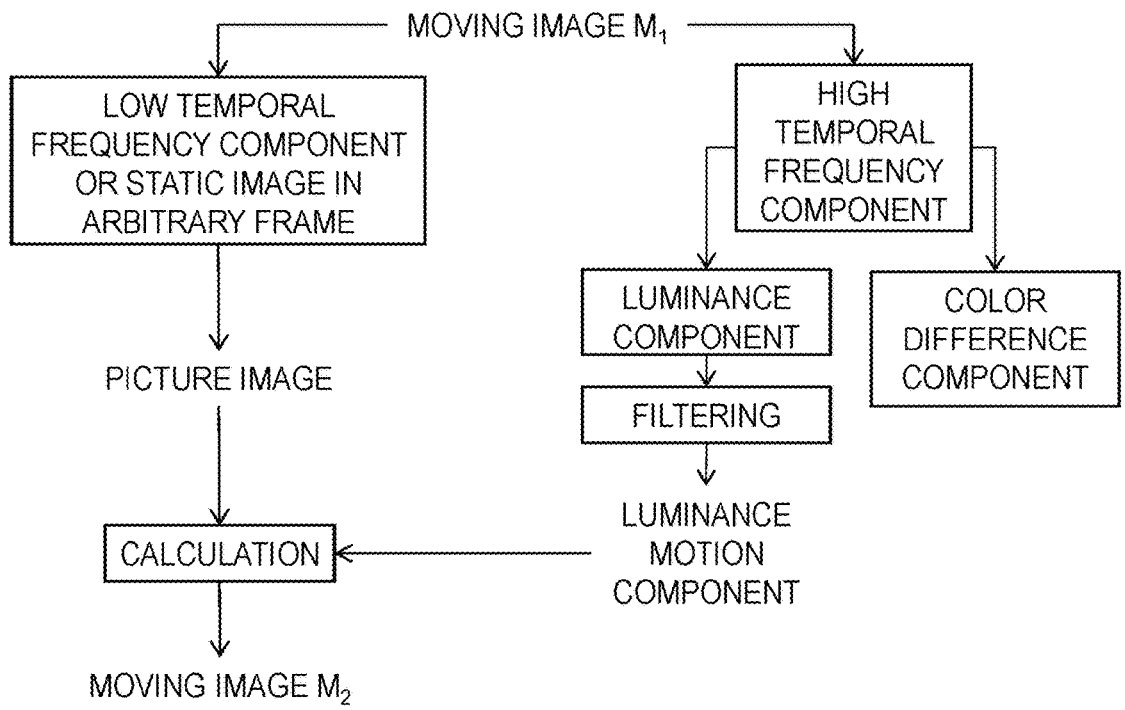

As described above, due to the characteristics of motion view of the visual system, even if spatial resolution or contrast of a "luminance motion component" which is synthesized with a "picture image" is reduced, the quality of a moving image to be perceived is maintained. In the present embodiment, a "low temporal frequency component" of the moving image $M_1$ is defined as "a picture image (an image)" and a component obtained by reducing at least one of a high spatial frequency component and contrast of a luminance component extracted from a "high temporal frequency component" of the moving image $M_1$ (a luminance motion component image included in the moving image $M_1$) is defined as a "luminance motion component". For example, filtering for reducing at least one of a high spatial frequency component and contrast is performed with respect to a luminance motion component image. Subsequently, calculation for integrating (putting) the "luminance motion component" into (on) the "picture image" is performed and the moving image $M_2$ obtained through the calculation is displayed (FIG. 14B).

<Configuration>

As illustrated in FIG. 15, a moving image component extraction device 71 according to the present embodiment includes a low temporal frequency component extractor 511, a luminance motion component extractor 512, a filtering unit 719, and an output unit 513. The dynamic illusion presentation device 52 of the present embodiment is identical to that of the fifth embodiment. The moving image component extraction device 71 is configured when a predetermined program is read into a computer as that described above, for example.

<Processing>

Processing according to the present embodiment is described with reference to FIG. 16. The difference from the fifth embodiment is that filtering is performed with respect to the luminance motion component $Y_{motion}(x,y,t)$ (luminance motion component image) obtained in step S5123 and the luminance motion component after the filtering is put on the "picture image" so as to obtain the moving image $M_2$. Hereinafter, only processing of filtering with respect to the luminance motion component $Y_{motion}(x,y,t)$ obtained in S5123 is described.

The luminance motion component $Y_{motion}(x,y,t)$ obtained in step S5123 (where $x_{min} \leq x \leq x_{max}$, $y_{min} \leq y \leq y_{max}$, and $t_{min} \leq t \leq t_{max}$) is input into the filtering unit 719. The filtering unit 719 first converts $Y_{motion}(x,y,t)$ into a space-time frequency region so as to obtain $FY_{motion}(\xi,\eta,\tau)$ Here, $\xi$, $\eta$, and $\tau$ respectively denote a spatial frequency in the horizontal direction, a spatial frequency in the vertical direction, and a temporal frequency. A lower limit and an upper limit of the spatial frequency in the horizontal direction are denoted as $\xi_{min}$ and $\xi_{max}$ ($\xi_{min} < \xi_{max}$) respectively, a lower limit and an upper limit of the spatial frequency in the vertical direction are set as $\eta_{min}$ and $\eta_{max}$ ($\eta_{min} < \eta_{max}$), and a lower limit and an upper limit of the temporal frequency are denoted as $\tau_{min}$ and $\tau_{max}$ ($\tau_{min} < \tau_{max}$) respectively. $\xi$, $\eta$, and $\tau$ satisfy $\xi_{min} \leq \xi \leq \xi_{max}$, $\eta_{min} \leq \eta \leq \eta_{max}$, and $\tau_{min} \leq \tau \leq \tau_{max}$ respectively. An example in which Fourier transform is used is described below (Formula (18)). $FY_{motion}(\xi,\eta,\tau)$ in this case is a Fourier spectrum of $Y_{motion}(x,y,t)$.

$$FY_{motion}(\xi,\eta,\tau) = \iiint Y_{motion}(x,y,t) \exp[-2\pi i(x\xi+y\eta+t\tau)] \, dx\,dy\,dt \quad (18)$$

Though the integration range of Formula (18) is from $-\infty$ to $+\infty$, calculation may be actually performed only with respect to limited intervals $x_{min} \leq x \leq x_{max}$, $y_{min} \leq y \leq y_{max}$, and $t_{min} \leq t \leq t_{max}$. Further, discrete Fourier transform may be used (step S7191).

Subsequently, the filtering unit 719 multiplies $F Y_{motion}(\xi,\eta,\tau)$ by a filter $G(\xi,\eta,\tau)$ and further applies inverse Fourier transform so as to obtain a luminance motion component $gY_{motion}(x,y,t)$ (Formula (19)).

$$gY_{motion}(x,y,t) = \iiint FY_{motion}(\xi,\eta,\tau) G(\xi,\eta,\tau) \times \exp[2\pi i(x\xi+y\eta+t\tau)] \, d\xi\,d\eta\,d\tau \quad (19)$$

Though the integration range of Formula (19) is from $-\infty$ to $+\infty$, calculation may be actually performed only with respect to limited intervals $\xi_{min} \leq \xi \leq \xi_{max}$, $\eta_{min} \leq \eta \leq \eta_{max}$, and $\tau_{min} \leq \tau \leq \tau_{max}$. Further, inverse discrete Fourier transform may be used. The luminance motion component $gY_{motion}(x,y,t)$ is an example of a "luminance motion component having a temporal frequency an absolute value of which is equal to or larger than the second value".

$G(\xi,\eta,\tau)$ denotes a filter for reducing a high spatial frequency component or contrast. A filter for reducing a high spatial frequency component is a low-pass filter and a filter for reducing contrast (whole contrast) is a function for linearly-converting a gray level, a function for planarizing a histogram (spatiotemporal frequency filter), or the like, for example. A specific example of the low-pass filter is shown below (Formula (20)).

$$G(\xi, \eta, \tau) = \begin{cases} 1 & \text{for } |\xi| \leq a, |\eta| \leq b \\ 0 & \text{otherwise} \end{cases} \quad (20)$$

where a and b denote positive constants. Though the function for cutting a high spatial frequency Fourier spectrum in a stepwise manner is denoted as $G(\xi,\eta,\tau)$, any functions may be denoted as $G(\xi,\eta,\tau)$ as long as a high spatial frequency Fourier spectrum can be cut by the function (step S7192).

The following processing is same as processing in which the luminance motion component $Y_{motion}(x,y,t)$ of the fifth embodiment is replaced with the luminance motion component $gY_{motion}(x,y,t)$. As described above, even if a high spatial frequency of a luminance motion component moving image is reduced or contrast is reduced by filtering, the quality of a moving image in perception is not affected within an allowable range of the characteristics of the visual system. Therefore, even if the information amount of the luminance motion component is reduced by filtering, a visual experience comparable to the original moving image $M_1$ can be provided to a user.

Modification of Seventh Embodiment

The seventh embodiment is the embodiment in which the luminance motion component $Y_{motion}(x,y,t)$ of the fifth embodiment is replaced with the luminance motion component $gY_{motion}(x,y,t)$. However, the luminance motion component $Y_{motion}(x,y,t)$ of modification 1 of the fifth embodiment may be replaced with the luminance motion component $gY_{motion}(x,y,t)$. In this case, steps S7191 and S7192 are executed after step S512' of FIG. 17. In a similar manner, the luminance motion component $Y_{motion}(x,y,t)$ of modification 2 of the fifth embodiment or the sixth embodiment may be replaced with the luminance motion component $gY_{motion}(x,y,t)$.

Eighth Embodiment

In an eighth embodiment, the above-described "image having a temporal frequency an absolute value of which is equal to or smaller than the first value" appears on a surface of an "object" and a "luminance motion component having a temporal frequency an absolute value of which is equal to or larger than the second value" is superimposed on this "image". This can also provide an illusion that the "image" is moving. Hereinafter, an example will be described in which a static "image" is printed on an "object" and a "luminance motion component having a temporal frequency an absolute value of which is equal to or larger than the second value" is projected on the "image".

<Configuration>

Figure 19:
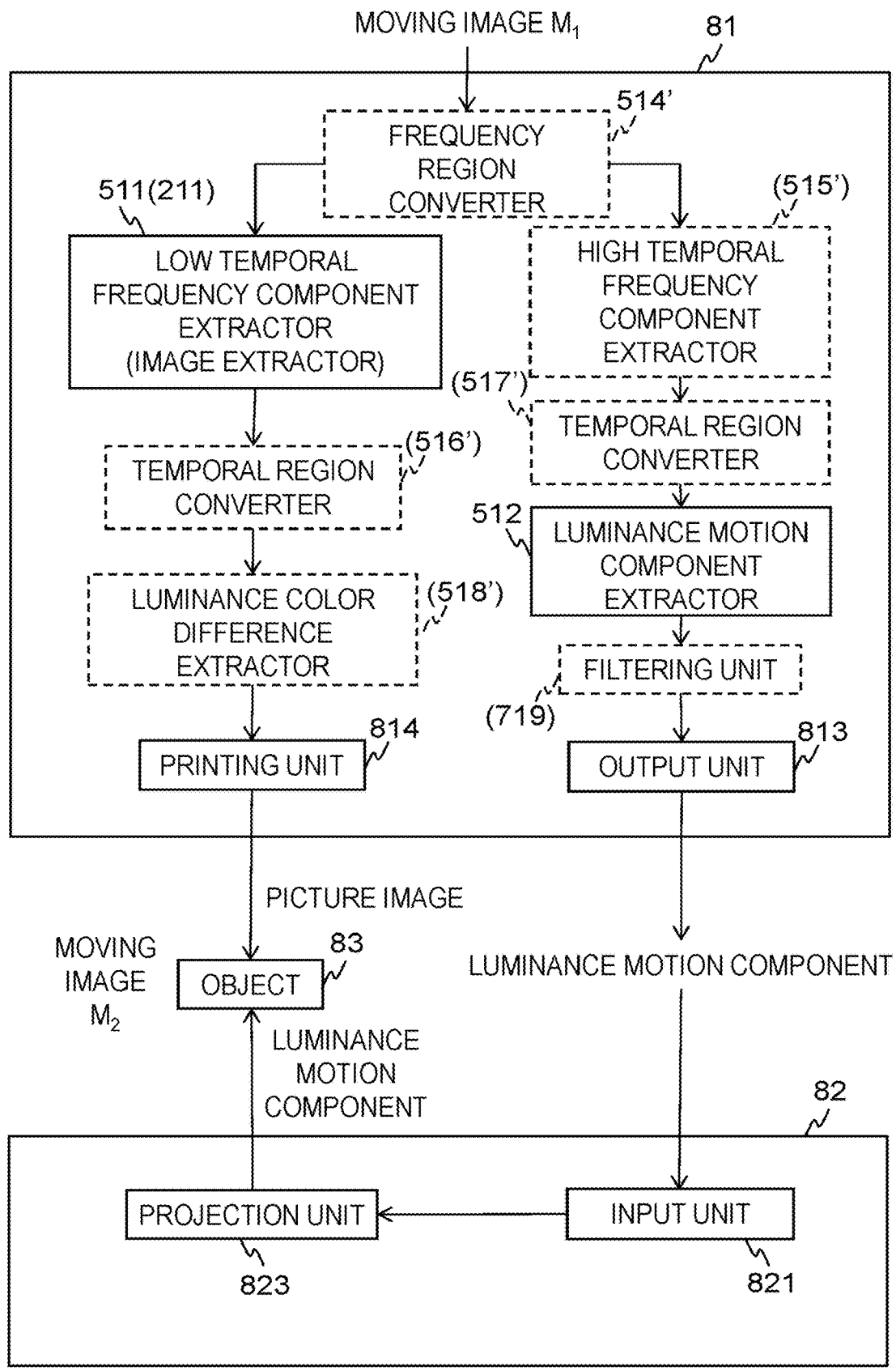
FIG. 19 is a block diagram illustrating the functional configuration of the embodiments.

As illustrated in FIG. 19, a moving image component extraction device 81 according to the present embodiment is a device in which the output unit 513 of any of the moving image component extraction devices 51, 51', 61, and 71 according to the fifth embodiment to the seventh embodiment and modifications of these embodiments is replaced with an output unit 813 and a printing unit 814. A dynamic illusion presentation device 82 (illusion presentation device) according to the present embodiment includes an input unit 821 and a projection unit 823 (projector). Further, an object 83 illustrated in the present embodiment is a two-dimensional medium such as a paper.

<Processing>

As any of the above-described embodiments and modifications, the static image $M_{static}$ (Formula (3)) extracted from the moving image $M_1$ is input into the printing unit 814 (an output unit). The printing unit 814 prints the image $M_{static}$ on a surface of the object 83. As any of the above-described embodiments and modifications, the luminance motion component $Y_{motion}(x,y,t)$ or $gY_{motion}(x,y,t)$ extracted from the moving image $M_1$ is transferred to the dynamic illusion presentation device 82 and input into the input unit 821. The luminance motion component $Y_{motion}(x,y,t)$ or $gY_{motion}(x,y,t)$ is transferred to the projection unit 823 and the projection unit 823 projects the luminance motion component $Y_{motion}(x,y,t)$ or $gY_{motion}(x,y,t)$ onto the image $M_{static}$ printed on the object 83 by a known light production technique (for example, Reference Literature 9: T. Kawabe, M. Sawayama, K. Maruya, S. Nishida, (2014), "A light projection method to perceptually deform two-dimensional static objects by motion information", Annual conference of the Institute of Image Information and Television Engineers 2014, 5-3) so as to display the moving image $M_2$ (Formula (21)).

$$M_2 = M_{static} \bigcirc Y_{motion}(x,y,t)$$

or $$M_2 = M_{static} \bigcirc gY_{motion}(x,y,t) \quad (21)$$

where $\bigcirc$ of Formula (21) denotes a state in which addition and multiplication of the luminance motion component $Y_{motion}(x,y,t)$ or $gY_{motion}(x,y,t)$ are compositely performed with respect to a luminance component of the image $M_{static}$ (a putting state). In other words, such a state is denoted that calculation including at least one of addition and multiplication is performed with respect to a luminance component of the image $M_{static}$ and the luminance motion component $Y_{motion}(x,y,t)$ or $gY_{motion}(x,y,t)$. That is, in the case where light is projected onto a printed material, it is presumed that luminance changes multiplicatively in one part and luminance changes additively in another part due to different reflection patterns corresponding to the characteristics of a paper or an ink. Therefore, calculation generating both of these luminance changes is denoted by $\bigcirc$. Here, Formula (6) represents a state in which the luminance motion component $Y_{motion}(x,y,t)$ is added to a luminance component in the image $M_{static}$ and Formula (7) represents a state in which a luminance component in the image $M_{static}$ is multiplied by a modulation ratio $Y'_{motion}(x,y,t)$ based on a motion of the luminance motion component $Y_{motion}(x,y,t)$. That is, in the present embodiment, in order that an object ($M_{static}$) will be perceived as if the object ($M_{static}$) were given a motion, a video ($Y_{motion}(x,y,t)$ or $gY_{motion}(x,y,t)$) is superimposed on the object. This video is a video including a luminance motion component corresponding to a motion given to the object (for example, a video including only a luminance component). Further, as illustrated in Formula (3) and Formula (21), the video is superimposed on the object so that a region of the object ($M_{static}$) and a region, which corresponds to a motion given to the object, in the video ($Y_{motion}(x,y,t)$ or $gY_{motion}(x,y,t)$) are overlapped with each other. Further, an absolute value of a temporal frequency of a luminance motion component in several pieces of frames in the video is larger than an absolute value of a temporal frequency in several pieces of frames in the video corresponding to the object.

A dynamic illusion can be presented by such way as well. Here, in the case where the luminance motion component $Y_{motion}(x,y,t)$ or $gY_{motion}(x,y,t)$ is projected by a projector, the luminance motion component $Y_{motion}(x,y,t)$ or $gY_{motion}(x,y,t)$ cannot have a negative value. Therefore, the whole luminance of the moving image $M_2$ is increased. Further, the luminance increase by the projection partially goes in a multiplicative fashion. Therefore, the luminance distribution in the moving image $M_2$ is largely different from the luminance of the original moving image $M_1$. Nevertheless, a user can have a visual experience of a motion of the original moving image $M_1$ from the moving image $M_2$. It is conceivable that adaptive luminance contrast normalization by the visual system is related to this as described in Reference Literature 9. Thus, a visual experience comparable to the original moving image $M_1$ can be provided to a user in this embodiment as well.

Modification of Eighth Embodiment

In the eighth embodiment, a static image $M_{static}$ is printed on an "object" such as a paper. However, this may be projected and displayed on an "object" such as a screen by another projector or may be displayed on an "object" such as an electronic paper, instead of printing this. Further, a "motion component moving image" may be projected on a transmission type display as that illustrated in Reference Literature 9. Further, in the case where the image $M_{static}$ is projected or displayed, the image $M_{static}$ does not have to be a static picture image but may be a picture image which moves slowly. In this case, a visual experience of a motion performed at a temporal frequency higher than that of the image $M_{static}$ can be provided to a user. Further, instead of extraction of the image $M_{static}$ from the moving image $M_1$, the moving image $M_1$ may be produced based on a static image obtained by photographing an "object" such as a building and a painting so as to generate the luminance motion component $Y_{motion}(x,y,t)$ or $gY_{motion}(x,y,t)$ from the moving image $M_1$ or the luminance motion component $Y_{motion}(x,y,t)$ or $gY_{motion}(x,y,t)$ may be generated from a static image obtained by photographing an "object". Thus, the generated luminance motion component $Y_{motion}(x,y,t)$ or $gY_{motion}(x,y,t)$ is projected onto an image appearing on a surface of an "object", thereby being able to provide an illusion that the "image" is moving.

Other Modifications Etc.

Here, the present invention is not limited to the above-described embodiments and modifications of these embodiments. For example, the moving image component extraction device and the dynamic illusion presentation device may be identical devices. Alternatively, processing of each unit included in the moving image component extraction device and the dynamic illusion presentation device may be implemented by devices different from each other.

The above-described various types of processing may be executed not only in a time-series manner in accordance with the description but also in a parallel manner or an independent manner, depending on processing capability of a device which executes the processing or as necessary. Further, it is indisputable that alterations can be arbitrarily made without departing from the intent of the present invention.

In a case where the above-described configuration is realized by a computer, processing contents of functions which should be obtained by respective devices are described by a program. By executing this program by a computer, the above-described processing functions are realized on the computer. The program in which the processing contents are described can be recorded in a recording medium which is readable by a computer. An example of the recording medium which is readable by a computer is a non-transitory recording medium. Examples of such recording medium include a magnetic recording device, an optical disk, a magnetooptical recording medium, a semiconductor memory, and the like.

This program is distributed by selling, transferring, or lending a portable recording medium such as a DVD and a CD-ROM in which the program is recorded, for example. Further, this program may be distributed such that this program is stored in a storage device of a server computer and is transferred from the server computer to other computers through the network.

A computer which executes such program once stores the program which is recorded in a portable recording medium or the program transferred from the server computer in a storage device thereof, for example. In execution of processing, this computer reads the program which is stored in a recording device thereof and executes processing in accordance with the program which is read. As another execution form of this program, a computer may directly read the program from a portable recording medium so as to execute processing in accordance with the program, and further, the computer may sequentially execute processing in accordance with a received program whenever a program is transferred from the server computer to this computer. The above-described processing may be executed by a service of an application service provider (ASP) type in which a processing function is realized only by an executing instruction of processing and result acquisition, without transferring the program to the computer from the server computer.

The data structure may be distributed in which "first picture image data for recording a first picture image obtained by photographing" and "second picture image data for recording a second picture image which is a narrow-band image, the narrow-band image being obtained such that a spatial frequency band of a whole picture image is narrowed to be narrower than a spatial frequency band of the first picture image while maintaining information of an edge included in the first picture image, which is superimposed and displayed on the first picture image so that an edge included in the narrow-band image is overlapped with an edge of the first picture image in display, and which has transparency" are associated with each other. This distribution may be performed by distributing the data structure through the internet or the like or may be performed by selling, transferring, or lending a portable recording medium such as a DVD and a CD-ROM in which the data structure is recorded.

Further, the data structure may be distributed which contains first data representing an "image which contains a spatial frequency component an absolute value of which is larger than zero and has a temporal frequency an absolute value of which is equal to or smaller than a first value" and second data representing a "luminance motion component corresponding to the image and having a temporal frequency an absolute value of which is equal to or larger than a second value". This distribution may be performed by distributing the data structure through the internet or the like or may be performed by selling, transferring, or lending a portable recording medium such as a DVD and a CD-ROM in which the data structure is recorded. A device received this data structure inputs the "first data" and the "second data" into an arithmetic unit, the arithmetic unit performs calculation for putting the "luminance motion component" on the "image" so as to obtain a moving image, and this moving image is displayed from a display unit. Alternatively, the first data is input into an output unit, the output unit displays the "image" on a surface of the "object", the second data is input into a projection unit, and the projection unit projects the "luminance motion component" onto the "image" displayed on the surface of the "object". Accordingly, a moving image providing a dynamic illusion can be displayed on the display unit or the object. Further, the data structure of a video may be distributed which is used in a device which superimposes a video on an "object" in order that the "object" will be perceived as if the "object" were given a motion. Here, an absolute value of a temporal frequency of the luminance motion component in several pieces of frames in a video is larger than an absolute value of a temporal frequency in several pieces of frames in a video corresponding to the "object". Alternatively, this data structure may contain a luminance motion component which is obtained by subtracting luminance static components, which are obtained from a static image based on a video corresponding to the "object", from respective luminance components of several pieces of frames in a video corresponding to the "object".

INDUSTRIAL APPLICABILITY

The present invention is applicable to (1) an advertisement field in which an impression of a motion is added to a paper medium, an impression of a motion is given to a signboard, or the like, by light projection (2) a field of interior design in which design of interior objects such as a floor and a wall is deformed illusorily, (3) fields of art, toys, and entertainment in which a motion is given to an illustration of a character, fusion with the conventional projection mapping technique is performed, or the like, for example.

What is claimed is:

1. A video presentation method comprising:
a presenting step in which a video having transparency is superimposed and displayed on an object or the video is projected onto the object, wherein
the video is a video in which differential picture images between a picture image of the object and picture images obtained by deforming the picture image of the object by pixel warp based on distortion distribution including low spatial frequency components are temporally switched, and
in the presenting step, the video is displayed or projected so that an edge included in the video is overlapped with an edge included in the object or an outline of the object.

2. A video presentation method comprising:
a photographing step in which an object is photographed so as to obtain an original image;
a video generation step in which several narrow-band images, the narrow-band images being different from each other, are generated from the original image so as to generate a video in which the narrow-band images which are generated and different from each other are arranged to be temporally smoothly continued; and
a presenting step in which the video which is generated is superimposed and displayed on the object or the video is projected onto the object, wherein
the narrow-band images are picture images which are obtained such that a spatial frequency band of a whole picture image is narrowed to be narrower than a spatial frequency band of the original image while maintaining information of an edge included in the original image, and
in the presenting step, the video which is generated is superimposed and displayed on the object or the video is projected onto the object so that an edge included in the object or an outline of the object and an edge included in the narrow-band images are overlapped with each other.

3. A video presentation device comprising:
processing circuitry configured to implement:
a presenting unit which superimposes and displays a video having transparency on an object or projects the video onto the object, wherein
the video is a video in which differential picture images between a picture image of the object and picture images obtained by deforming the picture image of the object by pixel warp based on distortion distribution including low spatial frequency components are temporally switched, and
the presenting unit displays or projects the video so that an edge included in the video is overlapped with an edge included in the object or an outline of the object.

4. A video presentation device comprising:
processing circuitry configured to implement:
a photographing unit which photographs an object so as to obtain an original image;
a video generation unit which generates several narrow-band images, the narrow-band images being different from each other, from the original image so as to generate a video in which the narrow-band images which are generated and different from each other are arranged so as to be temporally smoothly continued; and
a presenting unit which superimposes and displays the video, the video being generated, on the object, or projects the video onto the object, wherein
the narrow-band images are picture images which are obtained such that a spatial frequency band of a whole picture image is narrowed to be narrower than a spatial frequency band of the original image while maintaining information of an edge included in the original image, and
the presenting unit superimposes and displays the video, the video being generated, on the object, or projects the video onto the object, so that an edge included in the object or an outline of the object and an edge included in the narrow-band images are overlapped with each other.

5. A non-transitory computer readable recording medium having stored therein a program for making a computer execute processing of the device described in claim 3 or 4.

* * * * *